United States Patent
Mihara

(10) Patent No.: US 9,888,141 B2
(45) Date of Patent: Feb. 6, 2018

(54) INFORMATION PROCESSING APPARATUS, INFORMATION PROCESSING SYSTEM, METHOD OF PROCESSING INFORMATION, AND PROGRAM

(71) Applicant: Ayumi Mihara, Tokyo (JP)

(72) Inventor: Ayumi Mihara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/810,603

(22) Filed: Jul. 28, 2015

(65) Prior Publication Data
US 2016/0037010 A1    Feb. 4, 2016

(30) Foreign Application Priority Data
Jul. 31, 2014    (JP) .................................. 2014-155891

(51) Int. Cl.
H04N 1/00 (2006.01)
H04N 1/40 (2006.01)

(52) U.S. Cl.
CPC ..... *H04N 1/00954* (2013.01); *H04N 1/00209* (2013.01); *H04N 1/00244* (2013.01); *H04N 2201/0094* (2013.01)

(58) Field of Classification Search
CPC .......... H04N 1/00954; H04N 1/00209; H04N 1/00244; H04N 2201/0081

USPC ................ 358/448, 1.15, 1.13; 709/201, 202
See application file for complete search history.

(56) References Cited

U.S. PATENT DOCUMENTS

| | | | |
|---|---|---|---|
| 6,639,690 B1* | 10/2003 | Yamazaki | H04N 1/00249 355/40 |
| 8,903,886 B2 | 12/2014 | Masuda | |
| 2013/0013662 A1* | 1/2013 | Masuda | G06F 9/5038 709/201 |
| 2015/0082320 A1 | 3/2015 | Hori et al. | |

FOREIGN PATENT DOCUMENTS

| | | |
|---|---|---|
| JP | 2013-020326 | 1/2013 |
| JP | 2015-041319 | 3/2015 |
| JP | 2015-060306 | 3/2015 |

* cited by examiner

*Primary Examiner* — Quang N Vo
(74) *Attorney, Agent, or Firm* — IPUSA, PLLC

(57) ABSTRACT

An information processing apparatus includes a process control part configured to execute at least one processing unit provided for input data in an order which is defined in definition information, and a selection part configured to select a target processing unit, which is executed by the process control part, among a plurality of processing units defined in the definition information as a candidate to be executed after each of the at least one processing unit based on output information obtained from the at least one processing unit.

12 Claims, 20 Drawing Sheets

FIG.8

```
<jobInfo>
  <id>1111-2222-3333-4444</id>  ~610
  <flow>
    <id>Flow1</id>  ~510
    <plug-in order="1">
      <id>ocr</id>
      <parameters>
        ..........................
        <title> </title>  ~521
      </parameters>
    </plug-in>                                              520
    <plug-in order="2">
      <id>archive</id>
      <parameters>
        ..........................
        <fileType>zip </fileType>  ~531
      </parameters>
    </plug-in>                                              530
    <plug-in order="3">
      <id>rule</id>
      <parameters>
        <ruleId>Rule_001</ruleId>  ~541
        <ruleId>Rule_002</ruleId>  ~542
        <default>folder</default>  ~543
      </parameters>
    </plug-in>                                              540
    <plug-in order="4">
      <id>email</id>
      <parameters>
        <serverIp>111.111.111.113</serverIp>  ~551
        <portNumber>25</portNumber>  ~552
        <to1>bbb@abc.com</to1>  ~553
        <cc1>ccc@abc.com</cc1>  ~554
        <cc2>ddd@abc.com</cc2>  ~555
        <subject>{ocr/title}</subject>  ~556
        ..........................
      </parameters>
    </plug-in>                                              550
    <plug-in order="4">
      <id>folder</id>
      <parameters>
        <serverIp>111.111.111.111</serverIp>  ~561
        <folderPath>\aaa\bbb\ccc</folderPath>  ~562
        ..........................
      </parameters>
    </plug-in>                                              560
  <flow>
    ..........................
</jobInfo>
```

| RULE ID | RULE NAME | CONDITION DEFINITION ID | ACTION LIST ID |
|---|---|---|---|
| Rule_001 | ····· | Condition_List_001 | Action_List_001 |
| Rule_002 | ····· | Condition_List_002 | Action_List_002 |
| Rule_003 | ····· | Condition_List_003 | Action_List_003 |
| Rule_004 | ····· | Condition_List_004 | Action_List_004 |
| Rule_005 | ····· | Condition_List_005 | Action_List_005 |
| Rule_006 | ····· | Condition_List_006 | Action_List_006 |

| CONDITION DEFINITION ID | CONDITION NAME | CONDITIONAL EXPRESSION ID | CONDITION TYPE |
|---|---|---|---|
| Condition_List_001 | ···· | Condition_01 | and |
| Condition_List_002 | ···· | Condition_04<br>Condition_05 | or |
| Condition_List_003 | ···· | Condition_02<br>Condition_03<br>Condition_06 | and |

| CONDITIONAL EXPRESSION ID | BELONGING DESTINATION | TARGET PARAMETER | COMPARISON OPERATOR | COMPARISON VALUE |
|---|---|---|---|---|
| Condition_01 | ocr | title | = | "BILLING STATEMENT" |
| ... | ... | ... | ... | ... |
| Condition_05 | archive | fileType | = | zip |
| ... | ... | ... | ... | ... |

| ACTION LIST ID | ACTION NAME | ACTION ID |
|---|---|---|
| Action_List_001 | ..... | Action_01 |
| Action_List_002 | ..... | Action_02 |
| Action_List_003 | ..... | Action_01<br>Action_03 |
| : | : | : |

| ACTION ID | BRANCH DESTINATION | BELONGING DESTINATION | TARGET PARAMETER | CHANGED VALUE |
|---|---|---|---|---|
| Action_01 | email | email | to1 | aaa@abc.com |
| Action_02 | folder | folder | folderPath | ¥¥SHARED¥ACCOUNTING DEPARTMENT |
| Action_03 | archive | archive | fileType | LZH |

RULE EDIT — 720

RULE NAME: SENDING MAIL AFTER CHANGING DESTINATION IN RESPONSE TO OCR RESULT — 721

OK — 7223  EDIT — 7224  CANCEL — 724
ADD — 7223  EDIT — 7224  DELETE — 7225

CONDITION NAME: WHEN TITLE IS BILLING STATEMENT — 7221

— 722

| | BELONGING DESTINATION | TARGET PARAMETER | COMPARISON OPERATOR | COMPARISON VALUE |
|---|---|---|---|---|
| ☑ | ocr | title | = | BILLING STATEMENT |
| ☐ | | | | |
| ☐ | | | | |
| ☐ | | | | |

CONDITION TYPE: ☑ and  ☐ or — 7226

— 7222

ACTION LIST NAME: SENDING MAIL AFTER CHANGING DESTINATION — 7231

ADD — 7233  EDIT — 7234  DELETE — 7235

— 723

| | BRANCH DESTINATION | BELONGING DESTINATION | TARGET PARAMETER | CHANGED VALUE |
|---|---|---|---|---|
| ☑ | email | email | to1 | aaa@abc.com |
| ☐ | | | | |
| ☐ | | | | |
| ☐ | | | | |

| PARAMETER ID | ACCESS AUTHORITY | DATA FORM | COMPARISON OPERATOR | LABEL |
|---|---|---|---|---|
| serverIp | r | Text | =,<,>,<=,=>,!= | SERVER ADDRESS |
| portNumber | r | Text | =,<,>,<=,=>,!= | PORT NUMBER |
| to1 | rw | Text Format | =,!= | DESTINATION ADDRESS |
| : | : | : | : | : |

FIG.22

ACTION DEFINITION SETUP ~740

BRANCH DESTINATION: [PLEASE SELECT FROM VIEW ▽] ~741

BELONGING DESTINATION: [PLEASE SELECT FROM VIEW ▽] ~742

TARGET PARAMETER: [PLEASE SELECT FROM VIEW ▽] ~743

CHANGED VALUE: [ ] ~744

~745

[OK] [CANCEL]

INFORMATION PROCESSING APPARATUS, INFORMATION PROCESSING SYSTEM, METHOD OF PROCESSING INFORMATION, AND PROGRAM

BACKGROUND OF THE INVENTION

1. Field of the Invention

The present invention generally relates to an information processing apparatus, an information processing system, a method of processing information, and a program.

2. Description of the Related Art

In one type of a system, a predefined workflow can be performed for image data obtained by scanning a document using an image forming apparatus. In this system, the workflow is defined so that data flow in a mode corresponding to a business flow of a user.

An exemplary workflow is formed by connecting processing units such as an input of the data, a processing process for the data, and an output process of data generated by the processing process. Further, it is possible to define branching for a relation of connection between the processing units.

Patent Document 1: Japanese Laid-Open. Patent Publication No. 2013-20326

SUMMARY OF THE INVENTION

If a branch destination in the above workflow can be changed in response to a processing result obtained by the processing unit of a former stage, a flexibility of the workflow can be improved.

The present invention is provided in consideration of the above points, and an object of the invention is to improve a flexibility of a processing flow formed by a combination of the processing units.

It is a general object of at least one embodiment of the present invention to provide an information processing apparatus that substantially obviates one or more problems caused by the limitations and disadvantages of the related art.

One aspect of the embodiments of the present invention may be to provide an information processing apparatus including a process control part configured to execute at least one processing unit provided for input data in an order which is defined in definition information, and a selection part configured to select a target processing unit, which is executed by the process control part, among a plurality of processing units defined in the definition information as a candidate to be executed after each of the at least one processing unit based on output information obtained from the at least one processing unit.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

BRIEF DESCRIPTION OF THE DRAWINGS

FIG. 8 illustrates an exemplary job definition data in an initial state of the embodiment of the present invention.

FIG. 11 illustrates an exemplary structure of a rule definition table.

FIG. 12 illustrates an exemplary structure of a condition definition table.

FIG. 13 illustrates an exemplary structure of a condition expression table.

FIG. 15 illustrates an exemplary structure of an action list table.

FIG. 16 illustrates an exemplary structure of an action definition table.

FIG. 18 illustrates an exemplary display of a rule edit screen.

FIG. 21 illustrates exemplary parameter structure information.

FIG. 22 illustrates an exemplary display of an action definition setup screen.

DETAILED DESCRIPTION OF THE PREFERRED EMBODIMENTS

A description is given below, with reference to the FIG. 1 through FIG. 23 of embodiments of the present invention. Where the same reference symbols are attached to the same parts, repeated description of the parts is omitted.

Reference symbols typically designate as follows:
1: information processing system;
10: flow administration server;
11: job input part;
12: flow execution control part;
13: processing part;
13a: OCR processing part;
13b: archive processing part;
13c: rule processing part;
13d: mail delivery part;
13e: folder delivery processing part;

14: job queue;
15: flow definition memory part;
16: rule definition memory part;
20: client terminal;
30: image forming apparatus;
50: document administration server;
60: mail server;
70: file server;
100: drive device;
101: recording medium;
102: auxiliary memory device;
103: memory device;
104: CPU;
105: interface device;
111: scan input plug-in;
112: mail input plug-in;
113: folder input plug-in;
B: bus;
T1: rule definition table;
T2: condition definition table;
T3: conditional expression table;
T4: action list table; and
T5: action definition table.

Figure 1:
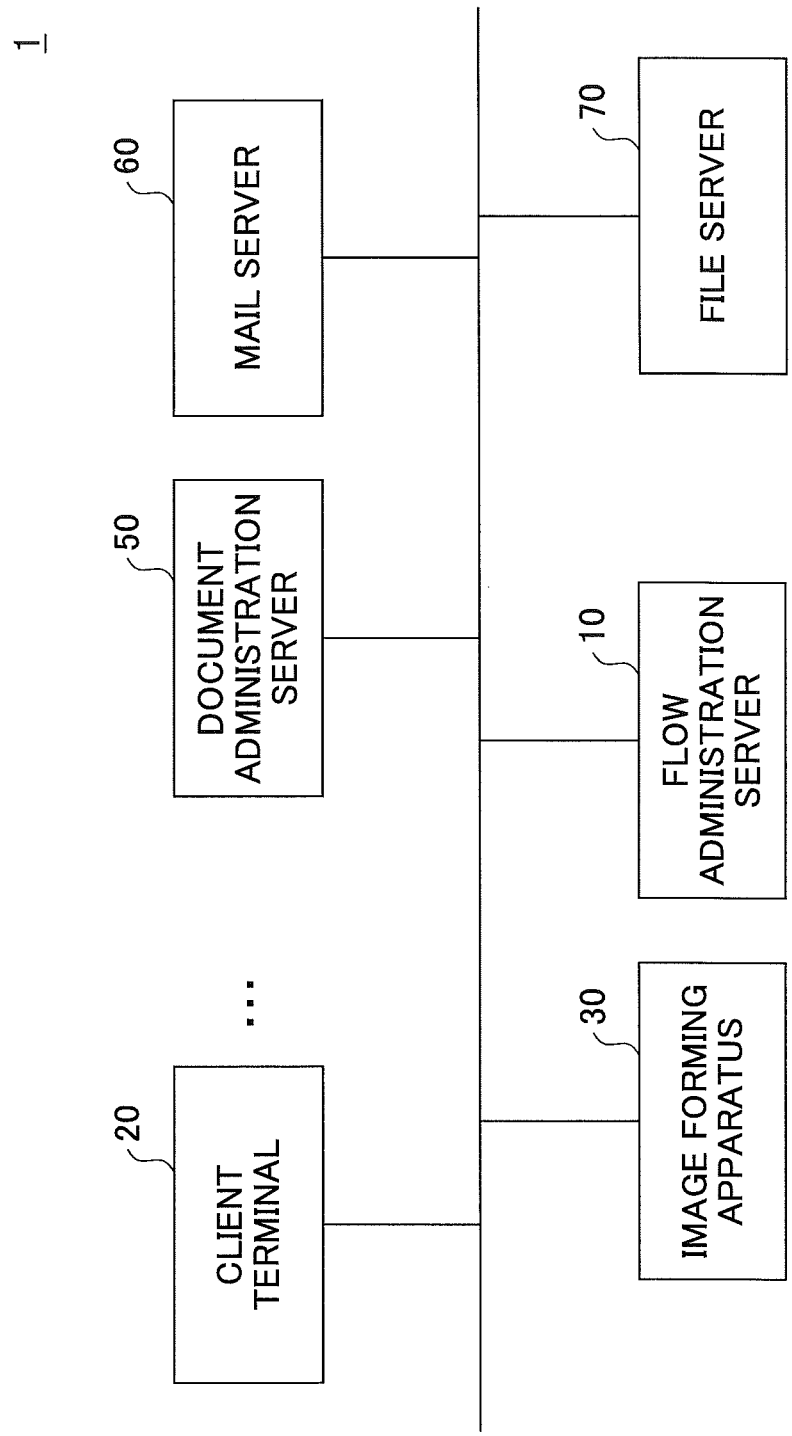
FIG. 1 illustrates an exemplary structure of an information processing system of an embodiment of the present invention.

Hereinafter, an embodiment of the present invention is described based on the figures. FIG. 1 illustrates an exemplary structure of an information processing system of the embodiment. Referring to FIG. 1, the information processing system 1 includes a flow administration server 10, at least one client terminal 20, at least one image forming apparatus 30, a document administration server 50, a mail server 60, a file server 70, and so on. The flow administration server 10, the at least one client terminal 20, the at least one image forming apparatus 30, the document administration server 50, the mail server 60, and the file server 70 are mutually connected by a local area network (LAN) or a wired or wireless network such as the Internet so as to be mutually communicable.

The flow administration server 10 is a computer executing a predefined workflow for data received through the network. For example, the workflow is a process flow realized by an arbitrary combination of at least one processing unit (at least one task), by each of which a complete function can be independently or individually realized. The above processing unit may correspond to an "activity" included in an ordinary terminology for the technical field of the workflow.

The client terminal 20 is a terminal used to make definition information (hereinafter, a "flow definition") related to the process flow of the workflow. For example, the user can make the flow definition through a screen displayed on the client terminal 20. The client terminal 20 may be a data input source for the flow administration server 10 and an output destination (a delivery destination) of an execution result of the workflow executed by the flow administration server 10. The client terminal 20 may be a personal computer (PC), a smartphone, a tablet type terminal, an image forming apparatus 30, or the like. Further, the client terminal 20 may be the same apparatus as the flow administration server 10.

The image forming apparatus 30 is an exemplary apparatus being an input source or an output destination of data which are a target to be processed in the workflow. For example, the image forming apparatus 30 sends the image data obtained by scanning an original manuscript to the flow administration server 10 as input data for the workflow. Further, the image forming apparatus 30 may print data delivered as the execution result of the workflow.

The document administration server 50 is a computer including a database which administers the data while associating the data with attribute information of the data. The document administration server 50 is an exemplary output destination of the execution result of the workflow executed by the flow administration server 10. When the document administration server 50 is the output destination, the output data are stored in the database of the document administration server 50.

The mail server 60 has a function similar to that of an ordinary mail server. Within the embodiment, the mail server 60 is an exemplary output destination of the execution result of the workflow executed by the flow administration server 10. In a case where the mail server 60 is the output destination, the output data is attached to an e-mail and transferred to a mail address set in the executed workflow. The mail server 60 may be the input source of the data which are a processing target of the workflow. For example, data attached to the e-mail directed to a predetermined address may be the processing target of the workflow.

The file server 70 is a computer which accumulates files commonly owned in the network 61 and administers these files. Within the embodiment, the file server 70 is an exemplary output destination of the execution result of the workflow executed by the flow administration server 10. For example, the data output to the file server 70 are stored in a folder provided inside the file server 70. The file server 70 may be the input source of the data which are the processing target of the workflow. For example, the file stored in a predetermined folder of the file server 70 may be sent to the flow administration server 10.

Figure 2:
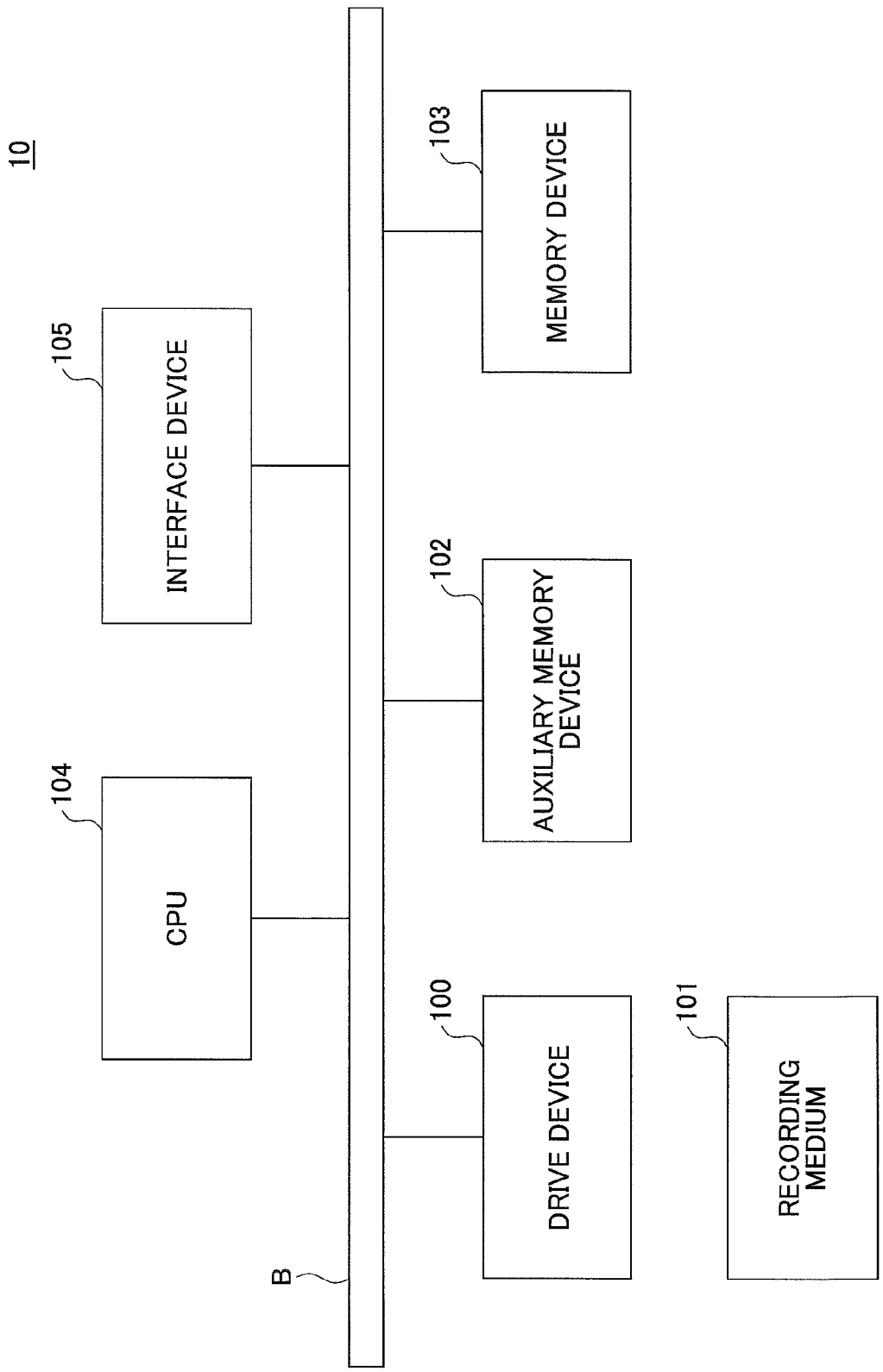
FIG. 2 illustrates an exemplary hardware configuration of a flow administration server of the embodiment of the present invention.

FIG. 2 illustrates an exemplary hardware configuration of a flow administration server of the embodiment of the present invention. The flow administration server 10 illustrated in FIG. 2 includes a drive device 100, an auxiliary memory device 102, a memory device 103, a CPU 104, and an interface device 105, and so on, which are mutually connected by a bus B.

A program realizing processes in the flow administration server 10 is supplied by a recording medium 101 such as a CD-ROM. When the recording medium 101 having the program recorded in it is set into the drive device 100, the program is installed on the auxiliary memory device 102 through the drive device 100 from the recording medium 101. However, the program may not always be installed from the recording medium 101 and may be downloaded from another computer through the network. The auxiliary memory device 102 stores necessary files, data, and so on in addition to the installed program.

The memory device 103 reads out the program from the auxiliary memory device 102 when the program is instructed to be invoked and stores the read program into the memory device 203. The CPU 104 performs a function related to the flow administration server 10 in conformity with the program stored in the memory device 103. The interface device 105 is used as an interface for connecting to the network.

The flow administration server 10 may be a computer system including multiple computers.

Figure 3:
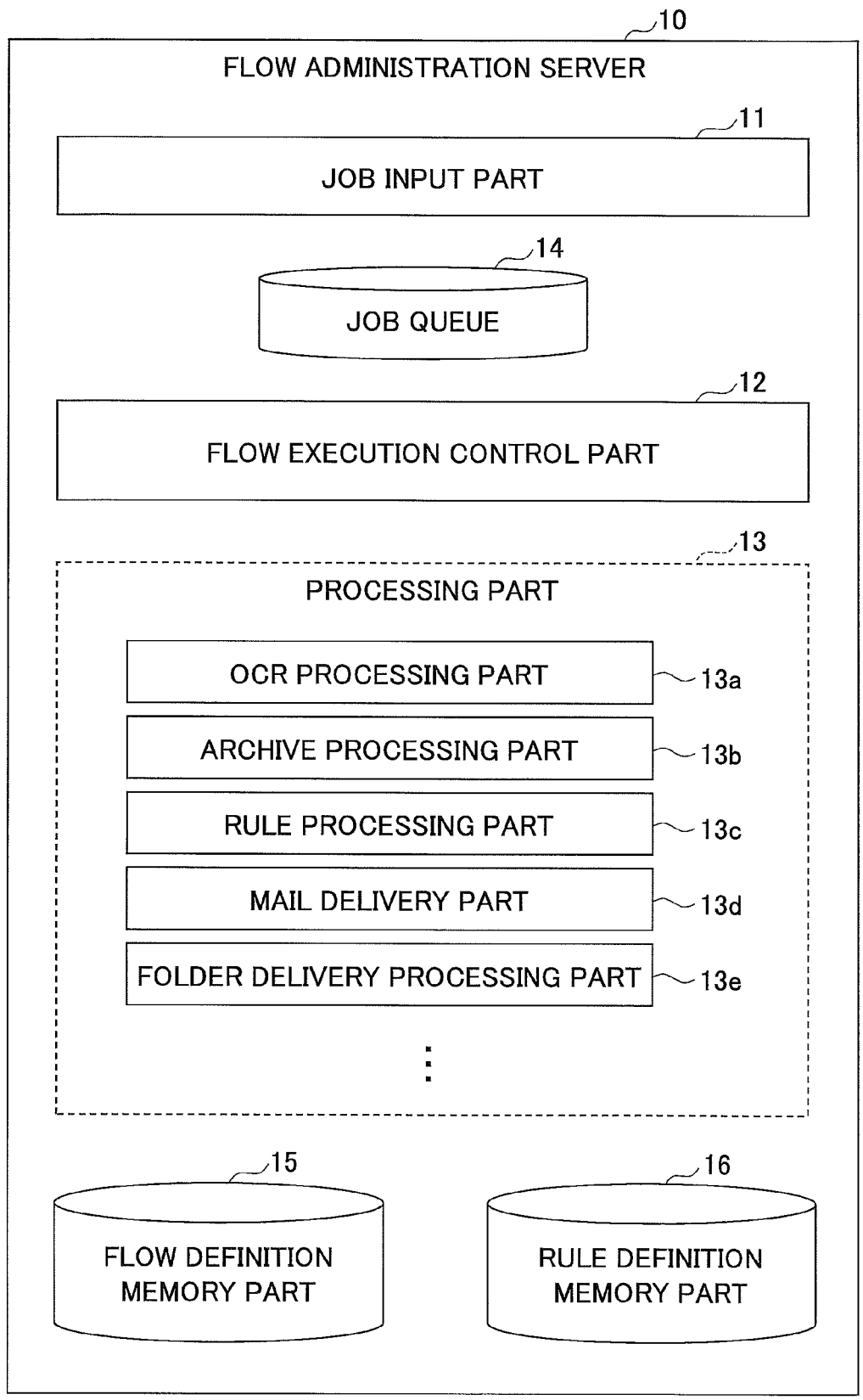
FIG. 3 illustrates an exemplary function structure of a flow administration server of the embodiment of the present invention.

FIG. 3 illustrates an exemplary function structure of the flow administration server of the embodiment of the present invention. Referring to FIG. 3, the flow administration server 10 includes a job input part 11, a flow execution control part 12, a processing part, and so on. These parts are substantialized when one or more programs installed on the flow administration server 10 are executed by the CPU 104. The flow administration server 10 uses a memory part such as a job queue 14, a flow definition memory part 15, and a rule definition memory part 16. These memory parts can be substantialized by the auxiliary memory device 102, a memory device or the like connected to the flow administration 100 through the network.

The flow definition memory part 15 stores the flow definition data. The flow definition data are data in which a flow definition is recorded. Within this embodiment, one of the flow definition data corresponds to one workflow. Therefore, the flow definition data is made for each of the workflows having mutually different procedures.

The job input part 11 receives an execution request of the workflow, input data for the workflow, and so on, and inputs the job information related to the workflow to the job queue 14. Within this embodiment, the job is an executable unit in executing the workflow. For example, in a case where the same workflows are executed multiple times, jobs corresponding to the workflows are different. Hereinafter, the job corresponding the workflow is referred to as a "flow job".

The job queue 14 stores the input job information in a mode of first-in first-out (FIFO). Job information is, for example, information including job definition data generated based on a copy of the flow definition data related to the flow job which is a target to be executed, data which are processing target such as image data sent from the image forming apparatus 30, meta information of the flow job, and so on. The meta information is attribute information about the entire flow job or the processing units forming the workflow related to the flow job. The meta information includes, for example, the user name of a user who has instructed to execute the flow job, the data size of the data which are the processing target, an execution date of the flow job, and so on. The job information corresponding to one flow job may be stored in one folder and administered by the one folder.

The flow execution control part 12 takes the job information out of the job queue 14 in conformity with an order of storing the job information into the job queue, and controls the execution of the flow job based on the job information that is taken out. For example, the flow execution control part 12 calls the processing part 13 corresponding to each of the processing units 13 in an order defined by the flow definition data included in the job information that is taken out.

The processing units 13 execute the processing units (the activities) forming the work flow. For example, one of the processing units is executed by one of the processing part 13. Therefore, the workflow is substantialized by a connection of the processing units executed by at least one of the processing parts 13 which have mutually different processing contents. However, the same processing units may appear at least two times in one workflow.

In the embodiment, at least one processing unit forming the work flow which is executed by the flow administration server 10 can be broadly classified into an input process, an intermediate process, an output process, and a rule process. For example, the input process is a process of inputting the input data into the work flow from an external apparatus such as the image forming apparatus 30.

For example, the intermediate process is a processing process for the data which is a processing target of the flow job. Examples of the intermediate process are an image correction process, an optical character recognition (OCR) process, a bar code recognition process, an image conversion process, and a translation process.

The output process is a process of outputting the data generated by the flow job in a mode where the user can use. The mode where the user can use includes not only a mode where the user can directly use such as printing to a paper but also a mode where the user can use through an application program or the like such as an electronic storage. An example of the output process is a delivery process to a folder of a predetermined computer. Further, a predetermined mail address may be a delivery destination. Further, an image forming apparatus 30 at the input source of the image data or another image forming apparatus other than this image forming apparatus 30 may be the delivery destination. In this case, the delivered data may be printed by the image forming apparatus 30 at the delivery destination.

The rule process is a process executed to select a branch destination of branching when the work flow has the branching, for example. Within the embodiment, information in which a selection standard or the like of the branch destination is defined is referred to as a "rule definition". The rule definition memory part 16 stores the rule definition for each of the branch destinations. Each rule definition includes a "condition definition" and an "action definition". The condition definition is a definition indicative of a condition which is required to be satisfied when the rule definition is selected or adopted (hereinafter, "selected" includes the meanings of "selected" and "adopted"). The action definition is information indicative of the processing unit to be executed in a case where the rule definition is selected. The branching of the work flow is substantialized when multiple processing units are defined as a candidate to be executed after a certain processing unit is executed in the flow definition data.

Referring to FIG. 3, examples of the processing part 13 are an OCR processing part 13a, an archive processing part 13b, a rule processing part 13c, a mail delivery part 13d, and a folder delivery processing part 13e. The OCR processing part 13a executes an OCR process for the data which are the processing target. The archive processing part 13b executes an archive process for the data which are the processing target. The archive process is a process of compressing the data so as to archive. The rule processing part 13c executes a rule process. The mail delivery part 13d executes a mail delivery process for the data which are the processing target. The mail delivery process is a process of sending an e-mail, to which the data that are the processing target is attached, to a predetermined address. The folder delivery processing part 13e executes a folder delivery process for the data which are the processing target. The folder delivery process is a process of sending the data which are the processing target to a predetermined folder.

The processing parts 13 may be substantialized by processes where mutually independent program modules cause the CPU 104 to execute. Hereinafter, the program module caused to function the flow administration server 10 (the CPU 104) as one processing part 13 is referred to as a "plug-in".

Among the input process, the intermediate process, a stop process, and the output process, the processing units 13 executes the intermediate process, the stop process, or the output process. The input process is executed by the job input part 11. In the input process, the external apparatuses being the input source of the data are various. For each of the external apparatuses, a data inputting method of inputting the data (a data acquisition method or a data receiving method for the flow administration server) may differ. In order to flexibly deal with this situation, the job input part 11 may have a structure illustrated in FIG. 4.

Figure 4:
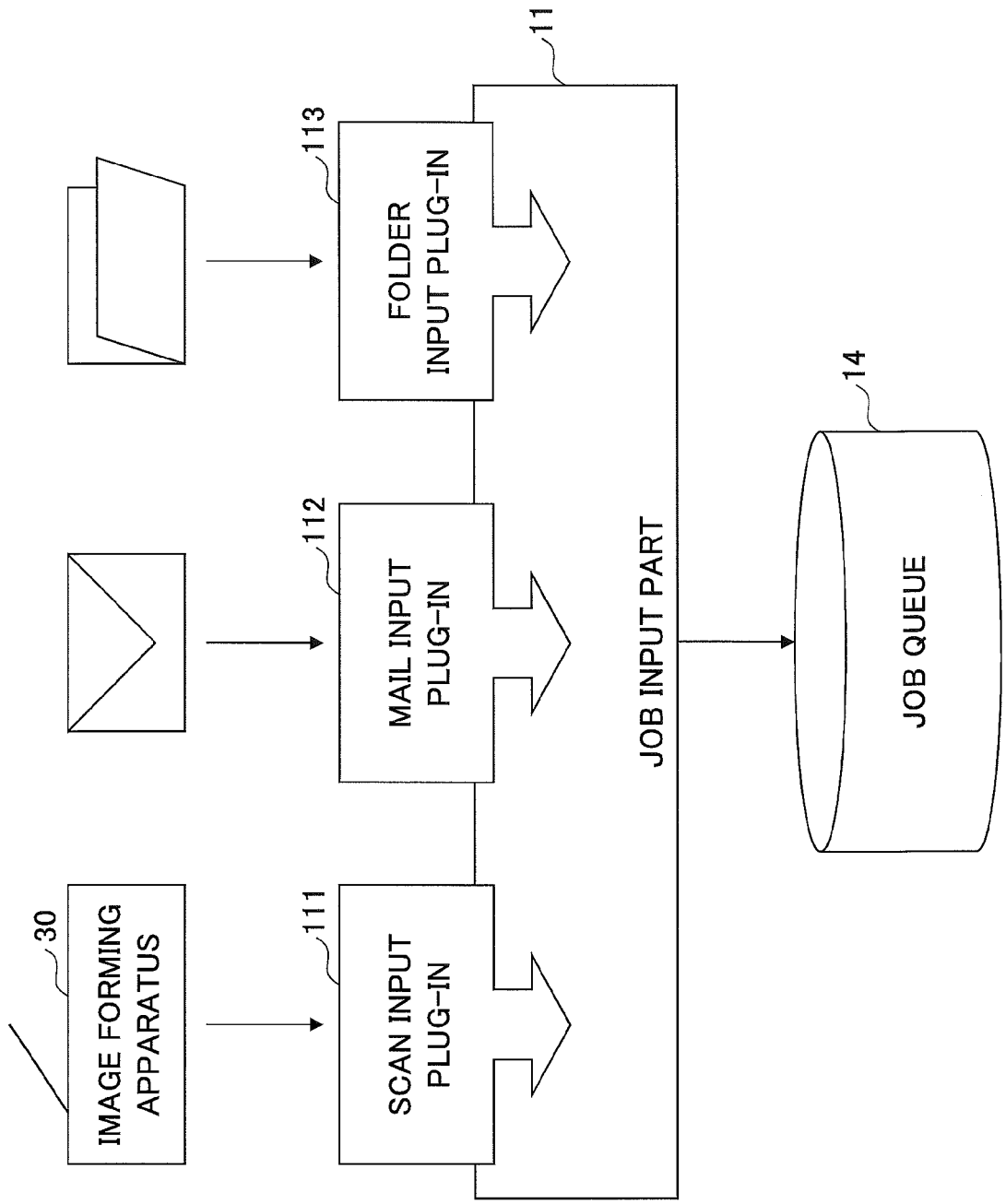
FIG. 4 illustrates an exemplary structure of a job input part.

FIG. 4 illustrates an exemplary structure of the job input part 11. A program module (a plug-in) which can plug in substantializes an exchange of the data between the job input part 11 and the input source of the data like an exchange of the data between the processing part 13 and the input source of the data. Referring to FIG. 4, a scan input plug-in 111, a mail input plug-in 112, and a folder input plug-in 113 are exemplified.

The scan input plug-in 111 is a plug-in that receives the input data from the image forming apparatus 30. Said differently, the scan input plug-in 111 receives the image data, which are obtained by scanning the image data using the image forming apparatus 30, as the input data from the image forming apparatus 30. A flow ID, setup information of the scan process, attribute information related to the image data, and so on are received along with the image data from the image forming apparatus 30. The scan input plug-in 111 generates the job information in conformity with a form planned by the flow execution control part 12 based on the received flow ID and image data, and stores the generated job information in the job queue 14. The flow ID is identification information for each definition of the workflow (said differently, each flow definition data). Further, the setup information of the scan process, the attribute information related to the image data, and so on form the meta information of the flow job.

The mail input plug-in 112 is a plug-in that receives the execution request to execute the workflow by an e-mail directed to a predetermined mail address. In this case, the data attached to the e-mail is the processing target processed by the workflow. These data may be image data or data having another form. The mail input plug-in 112 acquires an e-mail directed to the predetermined mail address from the mail server 60. The mail input plug-in 112 generates the job information in conformity with a form planned by the flow execution control part 12 based on the data attached to the e-mail and the flow ID described in the e-mail, and stores the generated job information in the job queue 14. The sending source address of the e-mail and the receiving date of the e-mail form the meta information of the flow job.

The folder input plug-in 113 is a plug-in that receives the execution request to execute the workflow by an upload of a file to a predetermined folder. The predetermined folder may be a folder formed in the auxiliary memory device 102 of the flow administration server 10 or a folder formed in a memory device (e.g., a memory device of the file server) connected to the flow administration server 10 through a network. The folder input plug-in 113 performs polling for a predetermined folder (periodically referring the predetermined folder), for example. If the predetermined folder stores a file (hereinafter, referred to as a "data file") including data being the processing target or a file (hereinafter, referred to as a "bibliographic file") including the flow ID or a setup value, the data file or the bibliographic file is acquired. The folder input plug-in 113 generates the job information in conformity with a form planned by the flow execution control part 12 based on the acquired data file and the acquired bibliographic file, and stores the generated job information in the job queue 14. The information stored in the bibliographic file forms the meta information of the flow job.

Meanwhile, a plug-in for inputting the input data may be added by a method other than the methods described above. For example, a plug-in for receiving the input data through a web page may be added.

As described, within the embodiment, each of the input process, the intermediate process, the stop process, and the output process is substantialized by the corresponding plug-in. Therefore, it is possible to increase a variation of the workflow which can be defined by generating the plug-in which executes a desired process and adding the generated plug-in.

Figure 5:
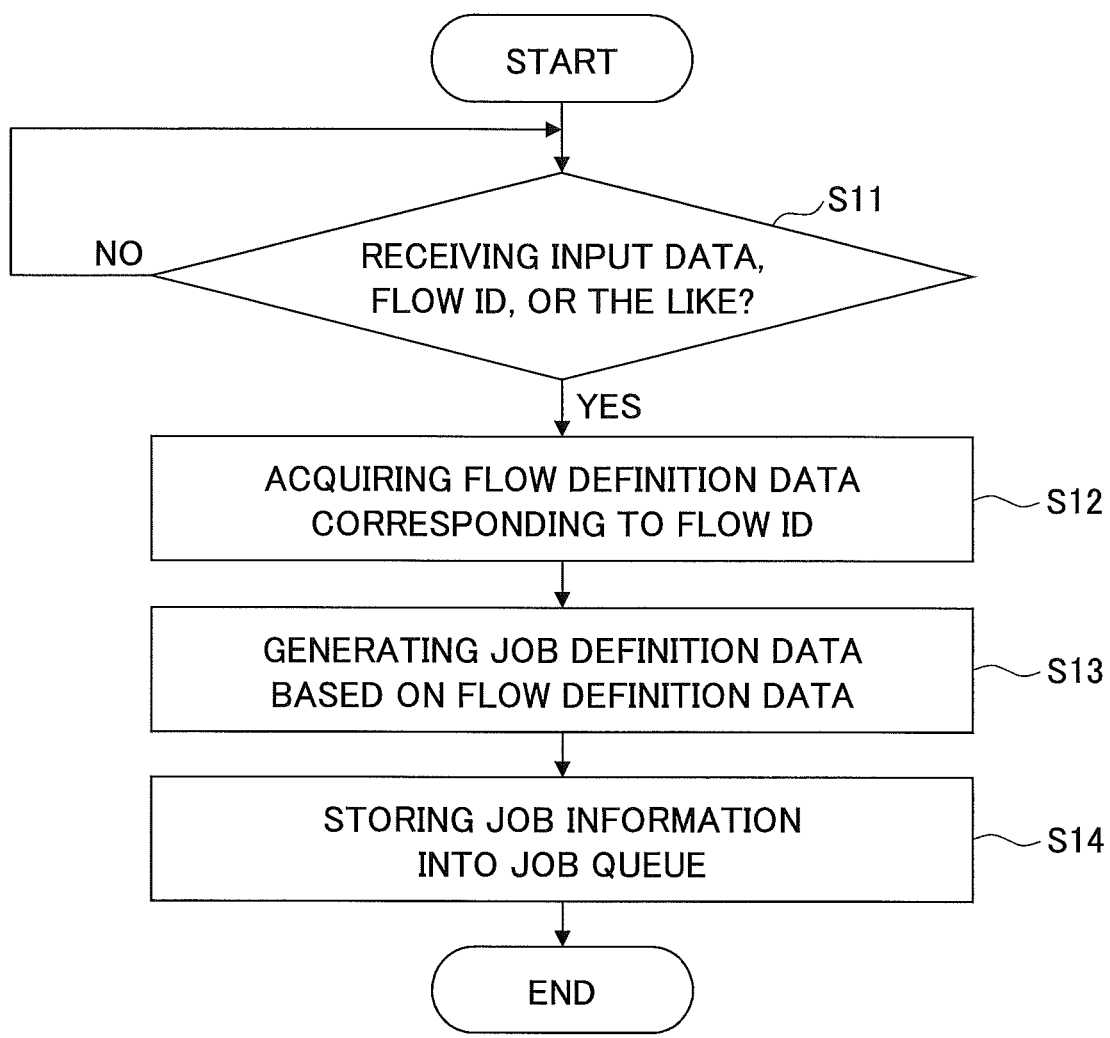
FIG. 5 is a flowchart illustrating an exemplary procedure performed by the job input part.

Hereinafter, a procedure executed by the flow administration server 10 or the like is described. FIG. 5 is a flowchart illustrating an exemplary procedure performed by the job input part 11. FIG. 5 exactly illustrates a process where any one of the plug-ins 111, 112, and 113 for the job input part 11 causes the flow administration server 10 to execute.

When the job input part 11 receives the input data for the workflow, the flow ID of the workflow being an executing target, information forming the meta information (step S11, YES), the job input part 11 acquires the flow definition data corresponding to the flow ID from the flow definition memory part 15 (step S12). The input data is scanned image data when the sending source of the input data is the image forming apparatus 30.

Figure 6:
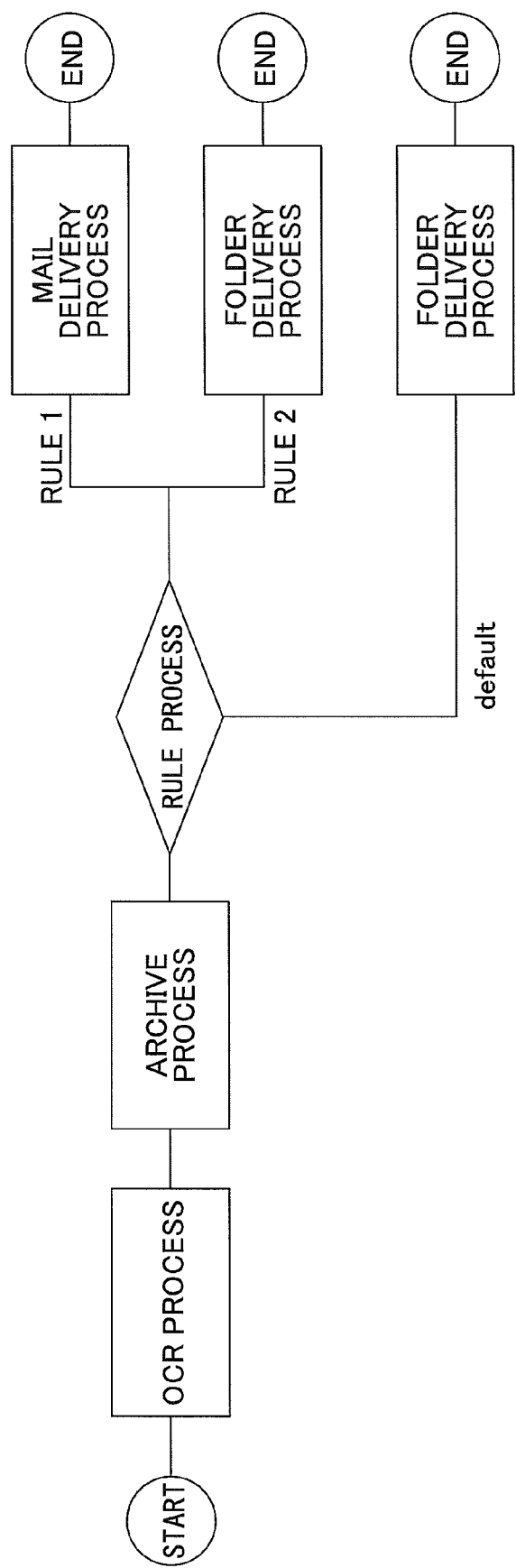
FIG. 6 illustrates an exemplary specific example of the embodiment of the present invention.

For example, within this embodiment, a workflow illustrated in FIG. 6 is the executing target. FIG. 6 illustrates an exemplary specific example of the embodiment of the present invention.

As illustrated in FIG. 6, within the embodiment, an OCR process is performed for the image data received from the image forming apparatus 30. By the OCR process, text data extracted from the image data are output. Next, an archive process is performed. The image data is compressed so as to be archived. Next, a rule process is performed. By the rule process, branching of the workflow is substantialized. Said differently, in a case where a "rule 1" is selected in the rule process, a mail delivery process is performed. In the mail delivery process, text data output by the OCR process is set to the subject line so that an e-mail, to which an archive file output by the archive process is attached, is sent to a preset mail address. Said differently, in a case where a "rule 2" is selected in the rule process, a folder delivery process is performed. In the folder delivery process, the archive file output by the archive process is sent to a predetermined folder. In a case where, neither the rule 1 nor the rule 2 is selected in the rule process, the folder delivery process is executed as a default. The folder at the sending destination of the archive file in the folder delivery process in the case where the rule 2 is selected may be different from the folder at the sending destination of the archive file in the folder delivery process of default. Each of the "rule 1" and "rule 2" indicate the rule definition.

Figure 7:
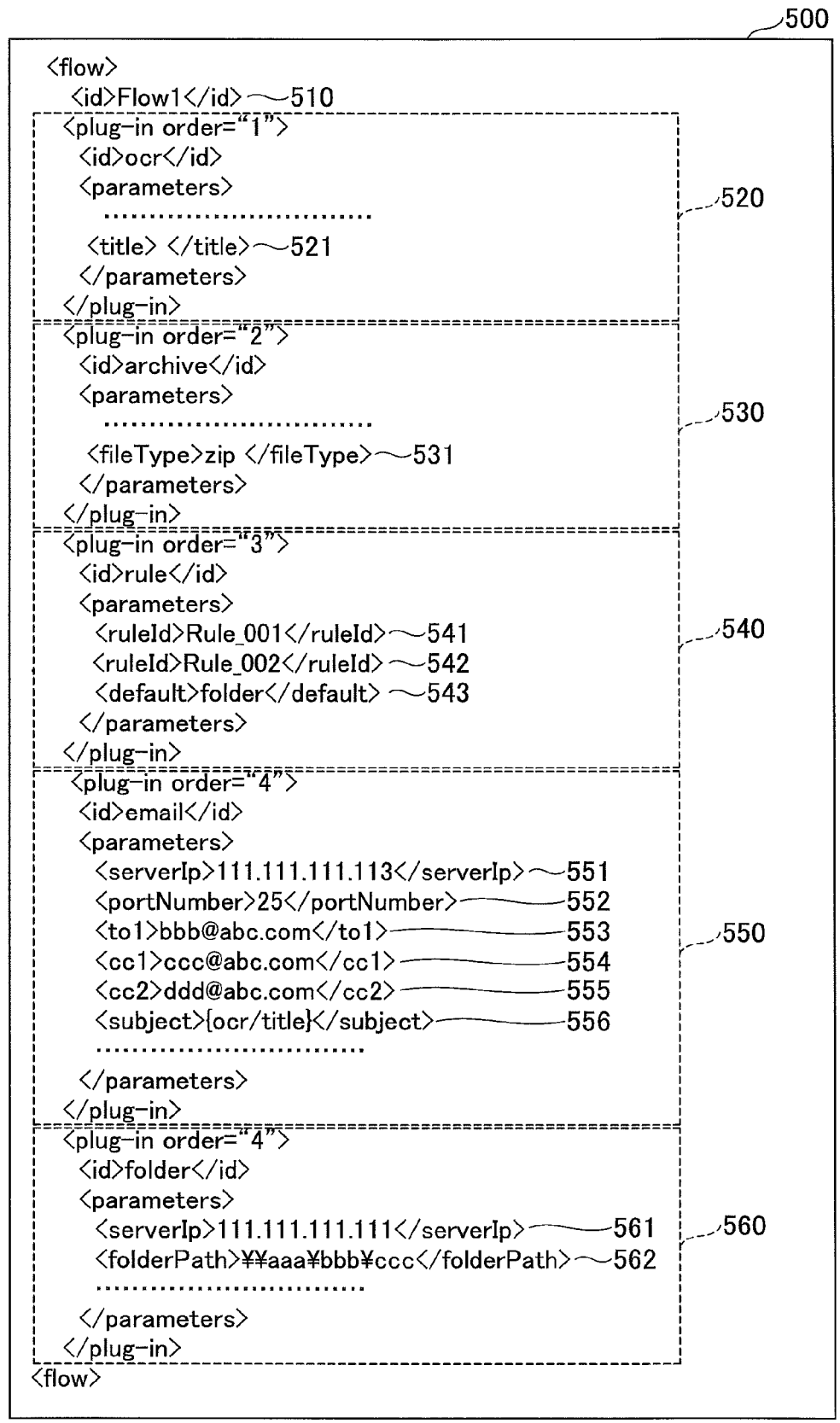
FIG. 7 illustrates an exemplary flow definition data of the embodiment of the present invention.

The flow definition data of the workflow illustrated in FIG. 6 is described as illustrated in FIG. 7. FIG. 7 illustrates an exemplary flow definition data of the embodiment of the present invention. Within the embodiment, the flow definition data are defined in a form of eXtensible Markup Language (XML). However, the flow definition data may be defined in another form such as a form of Comma Separated Values (CSV).

Referring to FIG. 7, the flow definition data 500 uses a flow element surrounded by a <flow> tag as a root element. The flow element includes an id element 510 and at least one plug-in element as a child element. The value "Flow 1" of the id element 510 is the flow ID.

A plug-in element is defined for each of the processing units. The flow definition data 500 includes a plug-in element 520 corresponding to a first OCR process, a plug-in element 530 corresponding to a second archive process, a plug-in element 540 corresponding to a third rule process, a plug-in element 550 corresponding to a fourth mail delivery process, and a plug-in element 560 corresponding to a fourth folder delivery process. There are two fourth processes, namely, the fourth mail delivery process and the fourth folder delivery process. This is because two kinds of candidates of the processing unit executed in the fourth place exist because of branching. Said differently, the mail delivery process is executed in a case where the rule 1 is selected in FIG. 6, and the folder delivery process is executed in a case where the rule 2 is selected or neither the rule 1 nor the rule 2 is selected in FIG. 6.

The plug-in elements includes an order attribute. The value of the order attribute indicates an execution order of the processing units related to the plug-in elements. Further, the plug-in elements include the id element and the parameter elements as the child element.

The value of the id element is the identification information of a program (a plug-in) causing the flow administration server 10 to function as the processing part of executing the processing units. The flow execution control part can call up the program based on the value of the id element. In the parameter element, an input parameter (input information) for the processing unit is designated and an output parameter (output information) from the processing unit is recorded. Each of the processing units treats corresponding input and output parameters, which are different for each of the processing units. Therefore, the structure of the value of the parameter element is differently provided corresponding to each of the processing units.

For example, the parameter element inside the plug-in element 520 corresponding to the OCR process includes a title element 521 or the like. The title element 521 is an element provided to store the result of the OCR process. Referring to FIG. 7, the value of the title element 521 is vacant. This is because the result of the OCR process is not confirmed at a time of generating the flow definition data 500. Said differently, the title element 521 records a character string extracted by the OCR process after the OCR process is executed based on the job definition data that are generated based on the flow definition data 500. The element name "title" of the title element 521 indicates a target range of OCR in an image formed by image data being an OCR target. Specifically, "title" indicates that the range corresponding to the title of the document on the image forming the document is a target range of OCR. Coordinate information of the range corresponding to the title of the document may be set inside the parameter element or separately set. The parameter element inside the plug-in element 520 may include an element corresponding to various input parameters related to the OCR process.

For example, the parameter element inside the plug-in element 530 corresponding to the archive process includes a fileType element 531 or the like. The value of the fileType element 531 indicates a form of the archive file. FIG. 7 illustrates an example where a form of zip is designated.

A parameters element inside the plug-in element 540 corresponding to the rule process includes at least one ruleId element and a default element 543. Referring to FIG. 7, an example where two ruleID elements, namely, the ruleId element 541 and ruleId element 542, are designated. The values of the ruleId elements indicate a rule ID corresponding to the rule definition being a selection candidate in the rule process. The rule ID is identification information for each of the rule definitions. Said differently, each of the rule definitions is associated with the rule ID and stored in the rule definition memory part 16. Within the embodiment, in order to easily enable the same rule definitions to be used in multiple flow definitions, the rule ID is designated in the flow definition data, as an example. The content of the rule definition may be described inside the flow definition data. The value of the default element 543 is information indicative of the processing nit (hereinafter, referred to as a "default processing unit") which is selected in a case where both the rule definition corresponding to the ruleID element 541 and the rule definition corresponding to the ruleID element 542 are not selected in the rule process. Within the embodiment, the value of the id element inside the plug-in element corresponding to the default processing unit is used as this information. Said differently, the value of the id element matches the value of the default element 543. Then, the processing unit corresponding to the plug-in element 560 whose execution order is next to the plug-in 540 is the default processing unit.

A parameters element inside the plug-in element corresponding to the mail delivery process includes a serverIp 551, a portNumber element 552, a tol element 552, a tol element 553, a cc1 element 554, a cc2 element 555, and a subject element 556, and so on. The value of the serverIp element 551 is the IP address of the mail server 60 at a request destination, to which a mail is requested to send. The value of the portNumber 542 is a port number of a SMTP server at the request destination, to which the mail is requested to send. The value of the tol element 553 is the first address of the e-mail of the sending target. The value of the cc1 element 554 is the first Cc address of the e-mail of the sending target. The value of the cc2 element 555 is the second Cc address of the e-mail of the sending target. The value of the subject element 556 is a subject line of the e-mail of the sending target. Here, the value of the subject element 556 is surrounded by brackets of [ ]. This indicates that the value related to the identification information designated inside the brackets of [ ] is adopted. The "ocr/title" indicates the value of the title element in the plug-in element 520 including the id element whose value is "ocr". Said differently, the "ocr/title" indicates the character string extracted by the OCR process. Therefore, the subject element 556 defines that the character string extracted by the OCR process is adopted as the subject line of the e-mail.

An parameters element inside the plug-in element 560 corresponding to the folder delivery process includes a serverIp element 561 and a folderPath element 562. The value of the serverIp element 561 is the IP address of the file server 70 having the folder which is the sending destination. The value of the folderPath element 562 is a path name of the folder which is the sending destination.

In step S12, flow definition data whose id element value matches the received flow ID are acquired.

Subsequently, the job input part 11 generates the job definition data based on a copy of the acquired flow definition data (step S13).

FIG. 8 illustrates an exemplary job definition data in an initial state of the embodiment of the present invention. Referring to FIG. 8, the same reference symbols as those in FIG. 7 are given to the same portions, and explanation of these portions is omitted.

Referring to FIG. 8, the job definition data 600a includes a jobInfo element as the rule element. Said differently, the job definition data 600a in the initial state is formed by adding the jobInfo element, which is a parent element of the flow element, to a copy of the flow definition data 500. The jobInfo element includes an id element 610, which is a child element other than the flow element. The value of the id element 610 indicates the job ID. The job ID is allocated by, for example, the job input part 11.

Subsequently, the job input part 11 stores the job information that includes input data, the job definition data 600a, and the meta information into the job queue 14. For example, a folder corresponding to the flow job is generated below a predetermined folder used as the job queue 14. Files respectively storing the input data, the job definition data, and the meta information may be stored into the folder.

Figure 9:
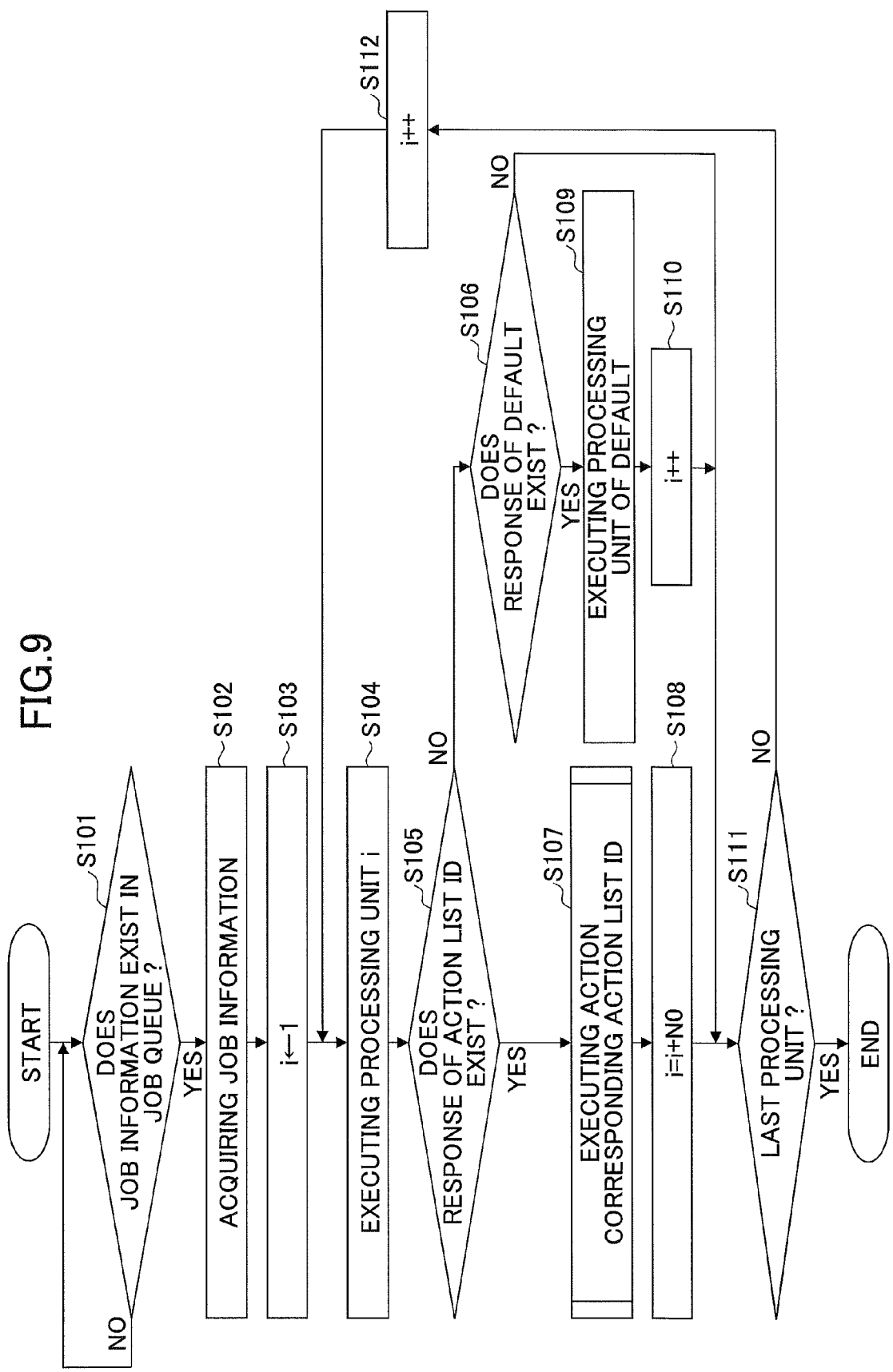
FIG. 9 is a flowchart illustrating an exemplary procedure executed by a flow execution control part.

Subsequently, described is a procedure executed in response to the storage of the job information into the job queue 14. FIG. 9 is a flowchart illustrating an exemplary procedure performed by a flow execution control part.

The flow execution control part 12 periodically refers to the job queue 14 (step S101). In a case where at least one job information is stored (YES in step S101), the flow execution control part 12 takes out the oldest job information among the at least one job information from the job queue (step S102). The taken-out job information is deleted from the job queue 14.

Subsequently, the flow execution control part 12 plugs 1 into a variable i (step S103). The variable i stores the execution order of the processing units of the executing target and is provided in the flow job (hereinafter, referred to as a "target flow job") based on the job definition data 600a included in the job information. Hereinafter, the processing unit executed in the i-th order is referred to as a "processing unit i".

Subsequently, the flow execution control part 12 causes the processing part 13 corresponding to the processing unit i to execute the processing unit i (step S104). For example, the flow execution control part 12 requests the processing part 13 to execute the processing unit i. The request includes identification information (hereinafter, referred to as a "job ID") of a target flow job. The processing part 13 executes the processing unit i based on the job information corresponding to the job ID. More specifically, the processing unit i is executed based on a parameter or the like, which is included in the plug-in element corresponding to the processing unit in the job definition data 600a included in the job information. The output information from the processing unit i may be recorded in the job definition data 600a. In a case where the processing unit i is an OCR process, text data extracted from the image data by the OCR process are written in the title element 521 (FIG. 8). After the processing unit i is completely executed by the processing part 13, the processing part 13 returns a response including the execution result from the processing unit i to the flow execution control part 12. The status of the processing unit is, for example, "completion" or "error". The "completion" indicates that the execution of the processing unit is normally completed. The "error" indicates that the execution of the processing unit abnormally ends. In a case where the processing part 13 corresponding to the processing unit i is the rule processing part 13c (said differently, the processing unit i is the rule process), an action list ID identifying the action definition, which is included in the rule definition selected by the rule process, is included in a response whose status indicates the "completion". In a case where no rule definition is selected, a value (hereinafter, referred to as a "default") indicating that there does not exist a corresponding rule is included in the response instead of the inclusion of the action list ID. A detailed rule process is described later. Referring to FIG. 9, a process performed in a case where the status includes "error" is omitted. In this case, for example, the execution of the target flow job is stopped.

Subsequently, the flow execution control part 12 determines whether the action list ID is included in the returned response (step S105). In a case where the action list ID is not included in the response (NO in step S105), the flow execution control part 12 determines whether the response includes the "default" (step S106). In a case where the response does not include the "default" (NO in step S106), the flow execution control part 12 determines whether the processing unit i is the last processing unit in the job definition data 600a (step S111). Here, the last processing unit designates the processing unit whose execution order is the last. In a case where the branching exists, the last processing unit designates the processing unit whose execution order in a route of the branch destination is the last. In a case where the processing unit i is not the last processing unit (NO is step S111), the flow execution control part 12 adds "1" to the variable i (step S112). Then, steps on and after step S104 are repeated. Said differently, in a case where the returned status is the "completion" and the processing unit i is other than the rule process, and when the processing unit i is not the last processing unit, the next processing unit is executed.

On the other hand, in a case where the action list ID is included in the response returned from the processing unit i (YES in step S105), the flow execution control part 12 executes an action specified based on the action list ID among multiple processing units i (step S107). Details of step S107 are described later. Subsequently, the flow execution control part 12 plugs "NO" into the variable i (step S108). The "NO" is the number of the processing units executed in step S107.

In a case where the action list ID is not included in the response returned from the processing unit i (NO in step S105) but the "default" is included in the response returned from the processing unit i (YES in step S106), the flow execution control part 12 executes the default processing unit among multiple processing units whose execution orders are after that of the processing unit i (step p S109). The default processing unit is specified based on the value of the id element inside the plug-in element includes in the response from the processing unit i. Said differently, this response includes a value "folder" of the default element inside the plug-in element 540, which is included in the job definition data 600a (FIG. 8). The flow execution control part 12 specifies the plug-in element 560 including the id element having a value matching the above value as a plug-in element corresponding to the default processing unit. Accordingly, the folder delivery process corresponding to the plug-in element 560 is executed. Subsequently, the flow execution control part 12 plugs "1" into the variable i (step S110). Subsequently, steps on and after step S111 are performed.

Figure 10:
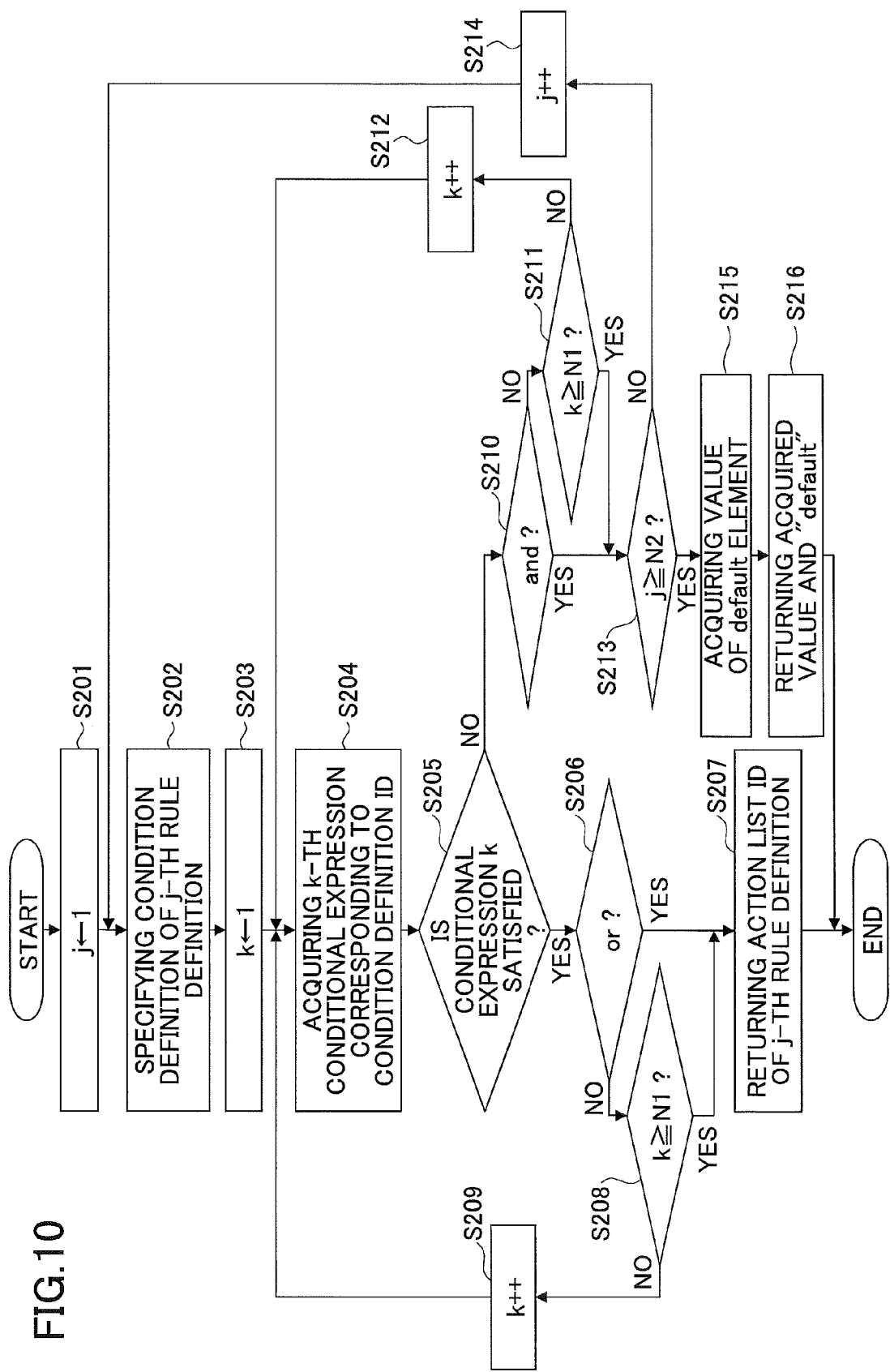
FIG. 10 is a flowchart for explaining an exemplary procedure of a rule process.

Next, a detailed description of the rule process is given. FIG. 10 is a flowchart for explaining an exemplary procedure of the rule process. The process illustrated in FIG. 10 is executed by the rule processing part 13c in a case where the processing unit ii is the rule process in step S104 of FIG. 9.

In step S201, the rule processing part 13c plugs "1" in the variable j. The variable j indicates the order of the ruleId elements, which are the processing targets selected among the ruleId elements (FIG. 8) inside the plug-in elements 540 corresponding to the rule process. For example, referring to FIG. 8, the ruleId element 541 is the first ruleId element, and the ruleId element 542 is the second ruleId element.

Subsequently, the rule processing part 13c specifies the rule definition corresponding to the j-th ruleId element inside the plug-in element 540 based on the rule definition table T1 stored in the rule definition memory part 16 (step S202).

FIG. 11 illustrates an exemplary structure of the rule definition table. Referring to FIG. 11, the rule definition table T1 stores a rule name, a condition definition ID, the action list ID, and so on.

The rule ID is identification information for each of the rule definitions. The rule name is a name for each of the rule definitions, which are set by the user. The condition definition ID is identification information of a group of identification information (hereinafter, referred to as a "conditional expression ID") of conditional expressions included in the condition definition forming the rule definition. The action list ID is identification information of a group (hereinafter, referred to as a "action list") of identification information (hereinafter, referred to as a "conditional expression ID") of actions included in the action definition forming the rule definition.

A correspondence relationship between the condition definition ID and the conditional expression ID is registered in a condition definition table T2 which is stored in the rule definition memory part 16.

FIG. 12 illustrates an exemplary structure of the condition definition table. Referring to FIG. 12, the condition definition table T2 stores a condition name, a conditional expression ID, a condition type, or the like in association with the condition definition ID. The condition name is a name for each of the condition definitions which are set by a user. The conditional expression ID is identification information for each of the conditional expressions forming the condition definitions. Multiple conditional expression IDs may be associated with one condition definition ID. The condition type is a value indicative of a mutual relationship between the conditional expression ID and the conditional expression, and is "and" or "or". Here, the "and" indicates that the conditional expressions corresponding to all the conditional expression IDs corresponding to the condition definition ID are required to be satisfied. The "or" indicates that the conditional expression corresponding to any of the conditional expression IDs corresponding to the condition definition ID is required to be satisfied.

For example, the value of the ruleId element 541 illustrated in FIG. 8 is "Rule_001". Therefore, in a case where the value of j is 1, "Condition_List_001" which is the condition definition ID associated with "Rule_001" is acquired in step S202. As a result, the condition definition forming the j-th rule definition is specified. Hereinafter, the condition definition ID acquired in step S202 is referred to as a "target condition definition ID", and a condition definition related to the target condition definition ID is referred to as a "condition definition j".

Subsequently, the rule processing part 13c plugs "1" in the variable k (step S203). The variable k is a variable storing the order of the conditional expressions, which are an evaluation target to be evaluated among at least one conditional expression forming a target condition definition. Subsequently, the rule processing part 13c acquires a conditional expression (hereinafter, referred to as a "conditional expression k") corresponding to the k-th conditional expression ID among the conditional expression IDs corresponding to the target condition definition ID from a conditional expression table T3 stored in the rule definition memory part 16 (step S204).

FIG. 13 illustrates an exemplary structure of the condition expression table. Referring to FIG. 13, the conditional expression table T3 stores a conditional expression in association with the conditional expression ID. The conditional expression includes items of a belonging destination, a target parameter, a comparison operator, and a comparison value.

The belonging destination and the target parameter are items for specifying values (hereinafter, referred to as an "evaluation value") to be compared with a comparison value. Said differently, the value of the belonging destination is identification information of an information unit, to which the evaluation value belongs. An example of the value of the belonging destination is a value of the id element included in each of the plug-in elements inside the job definition data 600a (FIG. 8). For example, the plug-in element including the id element having a value matching the value of the belonging destination corresponds to a plug-in element existing at an acquiring source of the evaluation value. The value of the target parameter indicates identification information of an item, which is the acquiring source of the evaluation value, in the information unit (for example, the parameters element inside the plug-in element) specified by the belonging destination. For example, an element whose element name (tag name) matching the value of the target parameter among child elements of the parameters elements inside the plug-in element is an example of the item which is the acquiring source of the evaluation value. Referring to FIG. 13, values of the belonging destination corresponding to "Condition_01" and the target parameter are "ocr" and "title", respectively. Therefore, in the job definition data 600a, the value of the title element of the plug-in element 520 including the id element having a value of "ocr" is the evaluation value. Referring to FIG. 8, the value of the title element 521 is vacant. However, the text data obtained by the OCR process are written in by the OCR processing part 13a at a timing when the rule process is executed. The belonging destination may be designated to be the value of the id element inside the plug-in element, the "system" indicative of attribute information related to the information processing system 1 or the entire system of the flow administration server 10, or the "Job" indicative of attribute information related to the flow job. In this case, the name of the item forming the attribute information related to the "system" or the name of the item forming the attribute information related to the job may be designated in the target parameter. Meanwhile, the attribute information related to the "system" and the "job" may be included in, for example, the meta information.

The comparison operator is an operator indicative of a relationship between the evaluation value and the comparison value so as to satisfy the conditional expression. The comparison value is to be compared with the evaluation value. Said differently, the conditional expression is satisfied when the evaluation value and the comparison value have a relationship indicated by the comparison operator. For example, the conditional expression related to the "Condition_01" is satisfied when the result of the OCR is a "billing statement".

Subsequently, the rule processing part 13c determines whether the acquired conditional expression k is satisfied (step S205). In a case where the conditional expression k is satisfied (YES in step S205), the rule processing part 13c determines whether the condition type of the condition definition j is "or" or "and" (step S206). In a case where the condition type is "or" (YES in step S206), if one conditional expression is satisfied, the condition definition j is satisfied. Therefore, the rule processing part 13c returns a response, which includes the "completion" as the status and the action list ID of the condition definition j, to the flow execution control part 12 (step S207). This action list is acquired from the rule definition table T1 (FIG. 11). As described, the action list is selected based on the evaluation result of the condition definition.

In a case where the condition type of the condition definition j is "and" (NO in step S206), the rule processing part 13c determines whether the value of the variable k is N1 or greater (step S208). The "N1" is the number of the conditional expression IDs corresponding the target condition definition ID in the condition definition table T2. Said differently, it is determined whether all the conditional expressions related to the condition definition j are evaluated. In a case where all the conditional expressions related to the condition definition j are evaluated (YES in step S208), the rule processing part 13c returns a response, which includes the "completion" as the status and the action list ID of the condition definition j, to the flow execution control part 12 (step S207). In a case where, there remains the conditional expression, which has not been evaluated for the condition definition j (NO in step S208), the rule processing part 13c adds "1" to the variable k (step S209). Thereafter, steps on and after step S204 are repeated. Said differently, the evaluation of the conditional expression, which has not been evaluated for the condition definition j, is executed.

In a case where the conditional expression k is not satisfied (NO in step S205), the rule processing part 13c determines whether the condition type of the condition definition j is "or" or "and" (step S210). In a case where the condition type of the condition definition j is "and" (YES in step S210), the rule processing part 13c determines whether the value of the variable j is N2 or greater (step S213). The "N2" is the number of the ruleID inside the plug-in element 540. Said differently, it is determined whether the condition definition related to all the rule definitions corresponding to the ruleID element inside the plug-in element 540 is evaluated. In a case where, there remains the rule definition, which has not been evaluated (NO in step S213), the rule processing part 13c adds "1" to the variable j (step S214). Thereafter, steps on and after step S202 are repeated. Said differently, the rule definition, which has not been evaluated, is evaluated.

In a case where the condition definition related to all the rule definitions corresponding to the ruleID element inside the plug-in element 540 is evaluated (YES in step S213), there is resultantly no satisfied condition definition. Then, the rule processing part 13c acquires a value of the default element 543 inside the plug-in element 540 from the job definition data 600a (FIG. 8). Subsequently, the rule processing part 13c returns a response, which includes the "completion" as the status, the "default", and the value of the default element 543, to the flow execution control part 12 (step S216).

In a case where the condition type of the condition definition j is "or" (NO in step S210), the rule processing part 13c determines whether the value of the variable k is N1 or greater (step S211). In a case where there remains the conditional expression, which has not been evaluated for the condition definition j (NO in step S211), the rule processing part 13c adds "1" to the variable k (step S212). Thereafter, steps on and after step S204 are repeated. In a case where all the conditional expressions related to the condition definition j are already evaluated (YES in step S211), steps on and after step S213 are executed.

Figure 14:
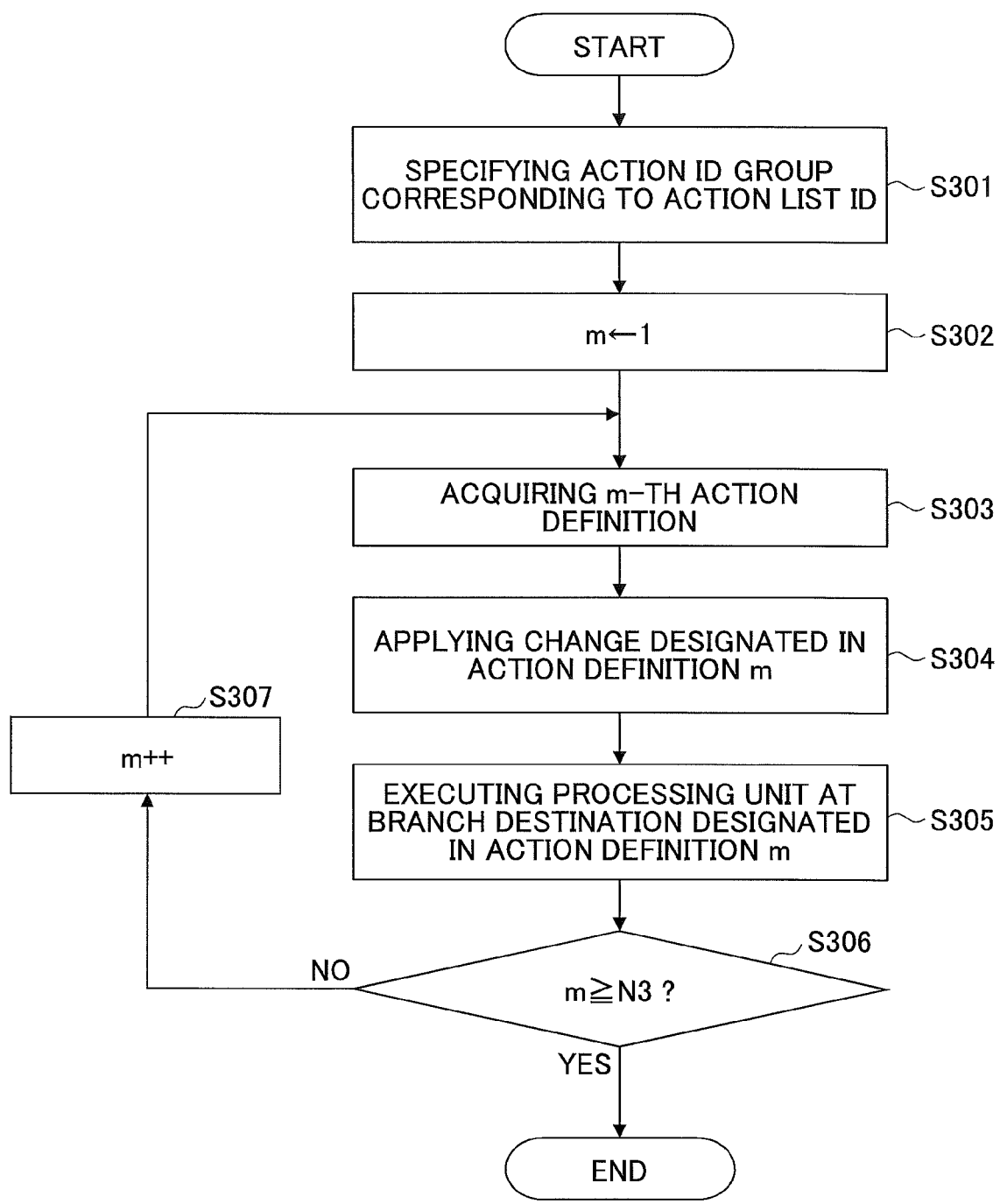
FIG. 14 is a flowchart for explaining an exemplary procedure of an execution process of an action.

Next, the step S107 of FIG. 9 is described in detail. FIG. 14 is a flowchart for explaining an exemplary procedure of the execution process of the action.

In step S301, the flow execution control part 12 specifies at least one action ID corresponding to the action list ID returned from the rule processing part 13c by referring to an action list table T4 stored in the rule definition memory part 16.

FIG. 15 illustrates an exemplary structure of the action list table. Referring to FIG. 15, the action list table T4 stores an action list name, at least one action ID, and so on in association with the action list IDs. The action list name is the name set by the user for each action list.

Subsequently, the flow execution control part 12 plugs "1" into the variable m (step S302). The variable m stores the order of the action IDs, which are the processing target among the at least one action IDs specified in step S301.

Subsequently, the flow execution control part 12 acquires the action definition corresponding to the m-th action ID from the action definition table T5 stored in the rule definition memory part 16 (step S303). Hereinafter, the acquired action definition is referred to as an "action definition m".

FIG. 16 illustrates an exemplary structure of an action definition table. Referring to FIG. 16, the action definition table T5 stores the action definition in association with the action ID. The action definition includes items such as the branch destination, the belonging destination, the target parameter, and a changed value.

The branch destination is identification information of the processing unit to be executed. Within the embodiment, the value of the item of the branch destination is designated by the value of the id element inside the plug-in element.

The belonging destination and the target parameter are items for specifying parameters of a changing target. Said differently, the value of the belonging destination is identification information of an information unit, to which the parameter of the changing target belongs. An example of the value of the belonging destination is a value of the id element included in each of the plug-in elements inside the job definition data 600a (FIG. 8). For example, the plug-in element including the id element having a value matching the value of the belonging destination corresponds to a plug-in element including the parameter of the changing target. The value of the target parameter indicates identification information of an item, which is the changing target, in the information unit (for example, the parameters element inside the plug-in element) specified by the belonging destination. For example, an element whose element name (tag name) matching the value of the target parameter among child elements of the parameters elements inside the plug-in element is the item to be the changing target. Referring to FIG. 16, values of the belonging destination corresponding to "Action_01" and the target parameter are "email" and "to1", respectively. Therefore, in the job definition data 600a, the value of the to1 element 553 of the plug-in element 550 including the id element having a value of "email" is the changing target.

The changed value is a value after changing the parameter which is the changing target. Said differently, the value of the parameter, which is the changing target, is overwritten by the changed value. The belonging destination may be designated to be the value of the id element inside the plug-in element, the "system" indicative of attribute information related to the information processing system 1 or the entire system of the flow administration server 10, or the "Job" indicative of the attribute information related to the flow job. In this case, the name of the item forming the attribute information related to the "system" or the name of the item forming the attribute information related to the job may be designated in the target parameter. Meanwhile, the attribute information related to the "system" and the "job" may be included in, for example, the meta information.

Subsequently, the flow execution control part 12 applies the change designated in the action definition m (step S304). Said differently, the value of the parameter specified by the belonging destination and the target parameter of the action definition m is overwritten by the changed value of the action definition m. For example, referring to FIG. 16, in a case where the action definition corresponding to "Action_01" is the action definition m, the value of the to1 element 553 inside the plug-in element 550 of the job definition data 600a (FIG. 8) is changed to "aaa@abc.com".

Said differently, within the embodiment, described is an example where the address of the mail delivery process, which is the processing unit at a later stage, is changed in response of a result of the OCR process at the former stage.

Subsequently, the flow execution control part 12 causes the processing unit of the branch destination designated by the action definition m to be executed by the processing part 13 corresponding to the processing unit (step S305). Said differently, the processing unit corresponding to the plug-in element specified by the branch destination of the action definition m is executed. For example, referring to FIG. 16, in a case where the action definition corresponding to "Action_01" is an action definition m, a mail delivery part 13*d* executes a mail delivery process based on the plug-in element 550 including the id element, which has a value matching a value of the branch destination of the action definition among the plug-in elements whose execution order is next to that of the rule process in the job definition data 600*a* (FIG. 8) in a case where the action definition corresponding to "Action_01" is the action definition m in FIG. 16.

Subsequently, the flow execution control part 12 determines whether the value of the variable m is N3 or greater (step S306). Within this embodiment, N3 indicates the number of action IDs acquired in step S301. In a case where the value of the variable m is N3 or smaller (NO in step S306), the flow execution control part 12 adds "1" to the variable m (step S307). Then, steps on and after step S303 are repeated. In a case where the value of the variable m is N3 or greater (YES in step S306), the flow execution control part 12 ends the process of FIG. 14.

As described, within the embodiment; the processing unit of the branch destination can be changed in response to the execution result (the output information) processing unit at the former stage. Further, a parameter (the input information) used by the processing unit at the later stage can be changed in response to the execution result (the output information) at the former stage. Said differently, the flexibility of the workflow can be improved. As a result, it is possible to reduce the number of flow definitions. For example, in a case where the branch destination is required to be changed in response to the result of the OCR process related to the title of the document, if where the embodiment is not adopted, it is necessary to generate the flow definition for each of the titles of the documents and to select the flow definition which is determined by the user as the executing target. On the other hand, within the embodiment, the flow definitions can be integrated into one flow definition so that the user can select the same flow definition as the executing target regardless of the title of the document.

Within the embodiment, described is an example where the flow execution control part 12 executes to apply a change in the parameter designated as the action definition. However, the change may be applied by the rule processing part 13*c*. The processing part 13 using the parameter which is the changing target may change the parameter.

Further, within the embodiment, described is an example where the result of the OCR process is a selection standard (a selection standard of a branch destination). However, the embodiment may be applied to a combination of the processing unit other than the workflow illustrated in FIG. 6. For example, depending on whether the image data received from the image forming apparatus 30 is color or monochrome, the rule definition may be selected. Or, the rule definition may be selected in response to the execution result of a bar code recognition process for image data.

Subsequently, a setup example of the rule definition stored in the rule definition memory part 16 is described. The rule definition may be set through a rule setup screen 710 illustrated in, for example, FIG. 17.

Figure 17:
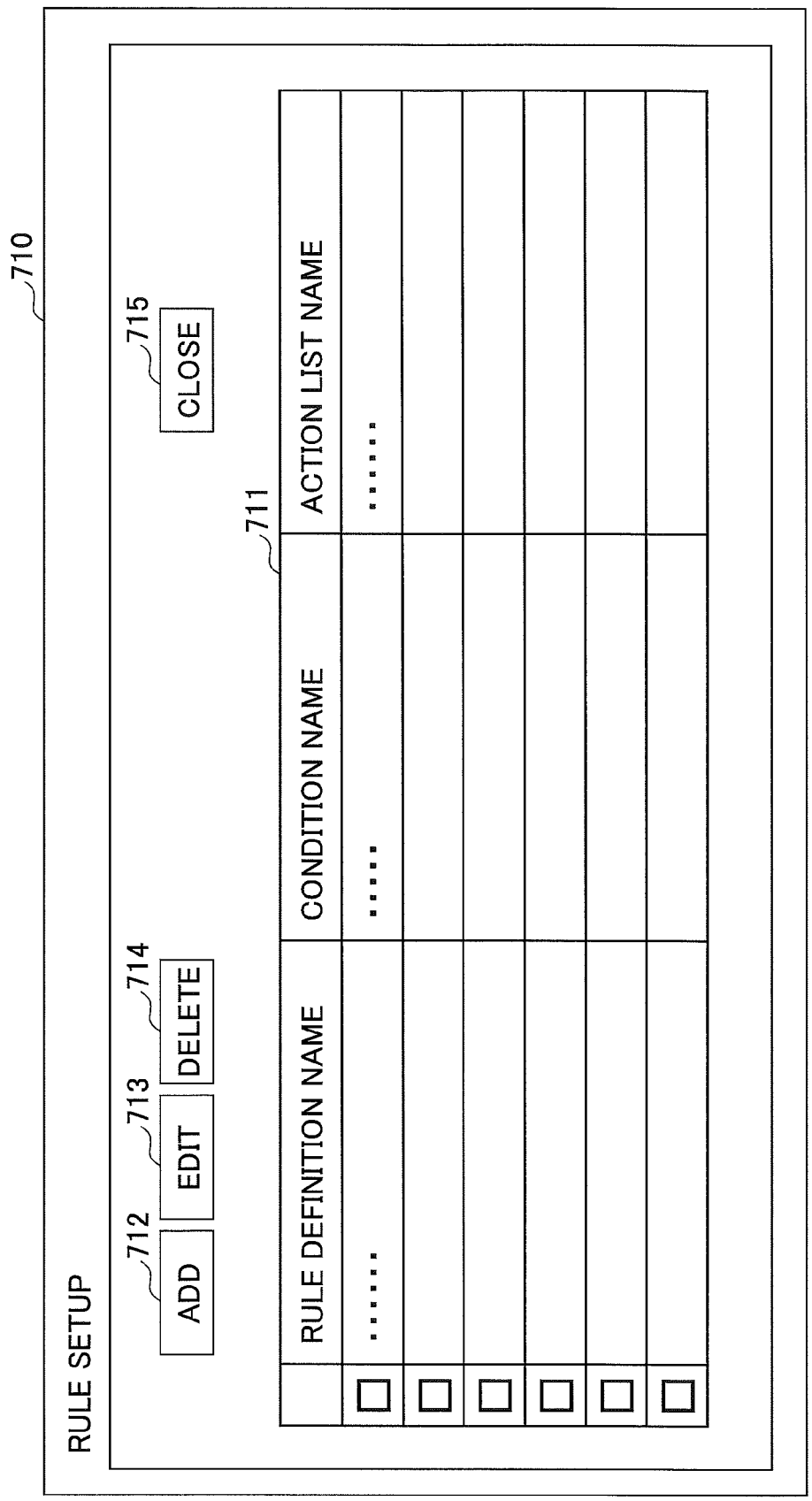
FIG. 17 illustrates an exemplary display of a rule setup screen.

FIG. 17 is an exemplary display of the rule setup screen. Referring to FIG. 17, the rule setup screen 710 includes a view display region 711, an add button 712, an edit button 713, a delete button, a close button 715, and so on. The rule setup screen 710 may be a web page downloaded from the flow administration server 10 and displayed by a web browser or the like, or may be displayed by dedicated application installed on the client terminal 20.

A view of the rule definitions set through the rule setup screen 710 is displayed on the view display region 711. The add button 712 is provided to receive an addition instruction of anew rule definition. The edit button 713 is a button for receiving an edit instruction to edit the rule definition of a row (hereinafter, referred to as a "selected row") selected on the view display region 711. The delete button 714 is provided to receive a delete instruction to delete the rule definition of the selected row. The close button 715 is a button provided to receive a close instruction to close the rule setup screen 710.

For example, when the add button 712 or the edit button 713 is pushed, a rule edit screen 720 is displayed in the client terminal 20.

FIG. 18 illustrates an exemplary display of the rule edit screen. Referring to FIG. 18, the rule edit screen 720 includes a rule name input region 721, a condition definition edit region 722, an action list edit region 723, an OK button 724, and so on.

The rule name input region 721 receives an input of a rule name. The condition definition edit region 722 is a region for receiving a setup related to the condition definition for forming the rule definition. The condition definition edit region 722 includes a condition name input region 7221, a conditional expression view display region 7222, an add button 7223, an edit button 7224, an delete button 7225, a condition type selection region 7226, and so on.

The condition name input region 7221 is a region for receiving an input of a condition name. A conditional expression view display region 7222 is a region where a view of set conditional expressions is displayed. The add button 7223 is provided to receive an additional instruction to add a new conditional expression. The edit button 7224 is a button for receiving an edit instruction to edit the conditional expression of the selected row in the conditional expression view display region 7222. The delete button 7225 is a button for receiving a delete instruction to delete the conditional expression of the selected row in the conditional expression view display region 7222. The condition type selection region 7226 is a region for receiving a selection of the condition type.

The action list edit region 723 is a region for receiving a setup related to the action list for forming the rule definition. Said differently, the action list edit region 723 includes an action list name input region 7231, an action definition view display region 7232, an add button 7233, an edit button 7234, and a delete button 7235.

The action list name input region 7231 is a region where an input of the action list name is received. The action definition view display region 7232 is a region where a view of set action definitions are displayed. The add button 7233 is provided to receive an additional instruction to add a new action definition. The edit button 7234 is a button for receiving an edit instruction to edit the action definition of the selected row in the action definition view display region

7232. The delete button 7235 is a button for receiving a delete instruction to delete the action definition of the selected row in the action definition view display region 7232.

For example, the OK button 724 is operable in a case where at least one condition definition and at least action list are respectively set in the condition definition edit region 722 and the action list edit region 723. When the OK button 724 is pushed, the client terminal 20 sends a setup content (a rule definition) in the action list edit region 723 to the flow administration server 10. The rule processing part 13c of the flow administration server 10 stores the setup content into the rule definition memory part 16.

Specifically, the content of the conditional expression view display region 7222 is stored in a conditional expression table T3 (FIG. 13). At this time, the conditional expression ID is automatically allocated by the rule processing part 13c. The condition definition table T2 (FIG. 12) stores the condition name input into the condition name input region 7221, the condition type selected in the condition type selection region 7226, and the conditional expression ID of the conditional expression. At this time, the condition definition ID is automatically allocated by the rule processing part 13c. Further, the content of the action definition view display region 7232 is stored in the action definition table T5 (FIG. 16). At this time, the action ID is automatically allocated by the rule processing part 13c. The action list table T4 (FIG. 15) stores the action list name input in the action list name input region 7231 and the action ID of the action definition. At this time, the action list ID is automatically allocated by the rule processing part 13c. Further, the rule definition table T1 (FIG. 11) stores the rule name input in the rule name input region 721, the condition definition ID, and the action list ID while associating these. At this time, the rule ID is automatically allocated by the rule processing part 13c.

Setup examples of the conditional expressions and the action definitions are described. When the add button 7223 in the condition definition edit region 722 is pushed, a conditional expression setup screen 730 is displayed in the client terminal 20.

Figure 19:
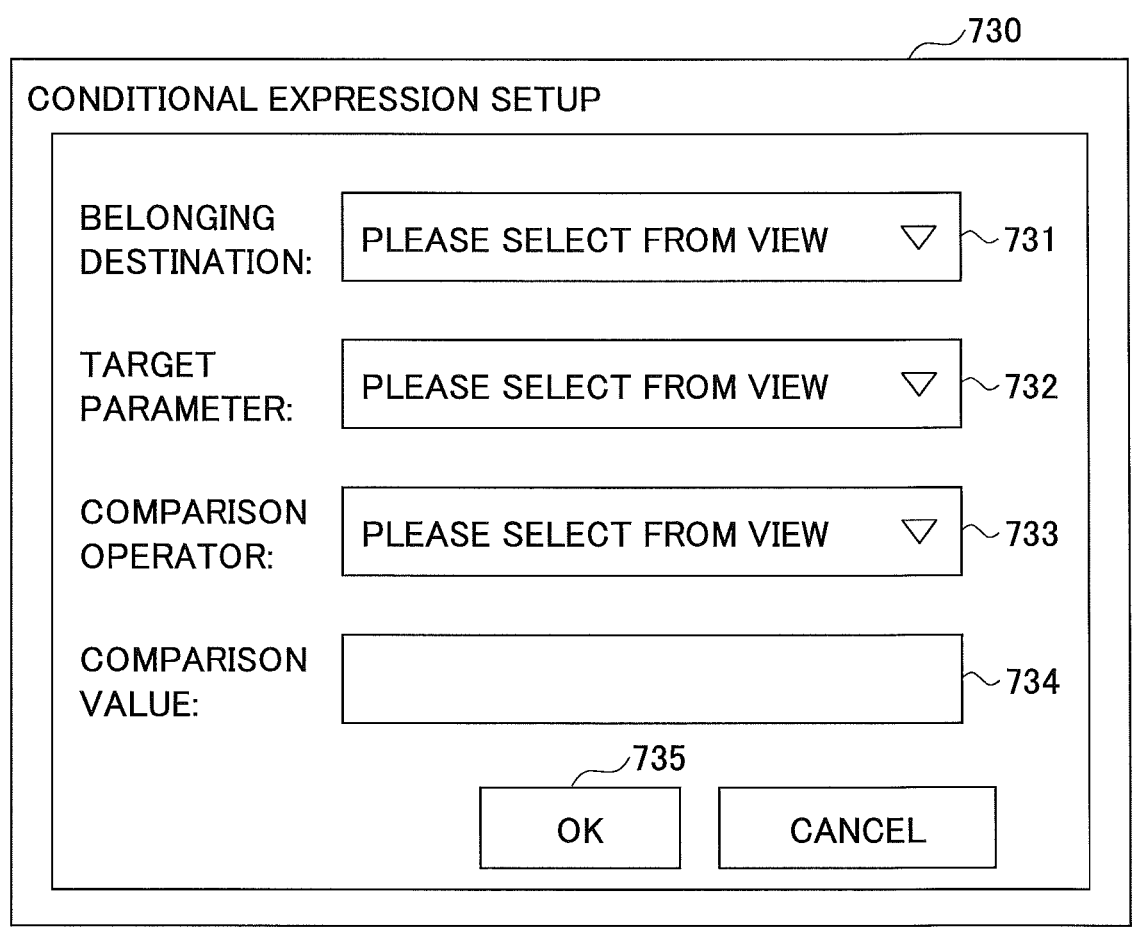
FIG. 19 is an exemplary display of a conditional expression setup screen.

FIG. 19 is an exemplary display of the conditional expression setup screen. Referring to FIG. 19, the conditional expression setup screen 730 includes a belonging destination selection region 731, a target parameter selection region 732, a comparison operator selection region 733, a comparison value input region 734, an OK button 735, and so on.

The belonging destination selection region 731, the target parameter selection region 732, and the comparison operator selection region 733 are respectively list boxes by which the belonging destination, the target parameter, and the comparison operator 733, which form the conditional expression, are selected. The comparison value input region 734 is a region through which an input of a comparison value forming the conditional expression is received.

Figure 20:
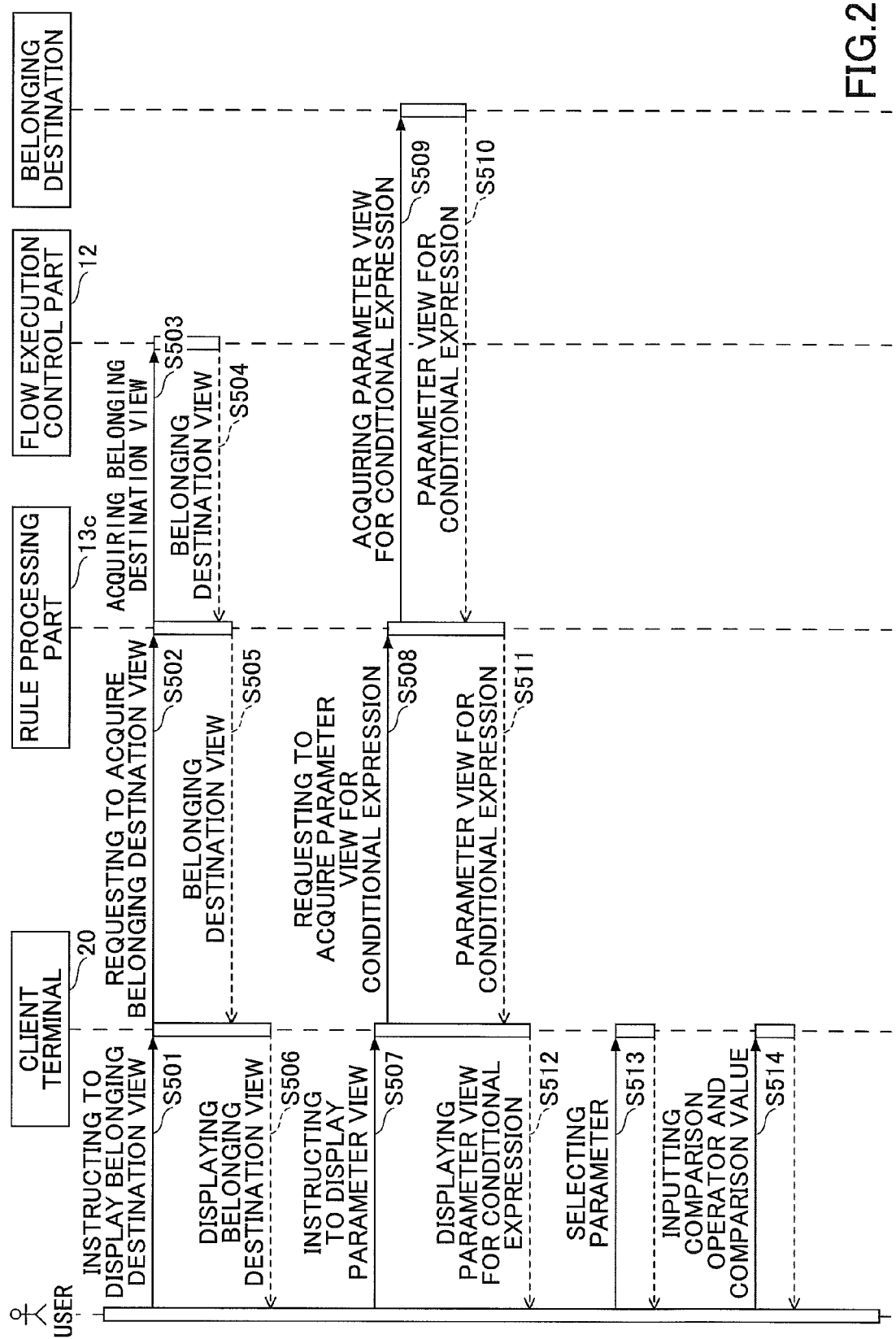
FIG. 20 is a sequence chart of explaining an exemplary procedure executed in response to an operation on a conditional expression setup screen.

FIG. 20 is a sequence chart of explaining an exemplary procedure executed in response to an operation on the conditional expression setup screen.

When the user operates the belonging destination selection region 731, a display of a view of the belonging destination is instructed (step S501). Then, the client terminal 20 sends an acquisition request to acquire a view of the belonging destinations to the rule processing part 13c of the flow administration server 10 (step S502). In a case where the rule definition is edited for a specific rule process of a specific flow definition, the acquisition request may include the floe ID of the flow definition and the execution order of the rule process. Hereinafter, described is based on the above situations. In a case where the rule definition is edited independently from the flow definition, it is unnecessary to narrow down using the flow ID and the execution order in the following process.

Subsequently, the rule processing part 13c designates the flow ID and the execution order and requests to acquire a view of the belonging destinations to the flow execution control part 12 (step S503). The flow execution control part 12 acquires view information (hereinafter, referred to as a "belonging destination view") of candidates of the belonging destinations and returns the belonging destination view to the rule processing part 13c in response to the acquisition request (step S504). The belonging destination view includes identification information (for example, the value (hereinafter, referred to as a "plug-in ID")) of at least one processing unit (a plug-in element) which is defined so as to be executed next in the designated execution order in the flow definition data specified by the designated flow ID. For example, if the rule definition related to the third rule process is an editing target in the flow definition data 500 illustrated in FIG. 7, the plug-in IDs of the plug-in elements 550 and 560 whose execution orders are the 4-th position are acquired and included in the belonging destination view. Further, the "system", the "Job", or the like may be included in the belonging destination view as a predetermined belonging destination.

Subsequently, the rule processing part 13c returns the belonging destination view to the client terminal 20 (step S505). The client terminal 20 uses a list box of the belonging destination selection region 731 and causes the views of the belonging destinations to be displayed (step S506). The user selects any one of the belonging destinations from the displayed belonging destination view.

When the user operates the target parameter selection region 732, a display of a view of target parameters is instructed (step S507). Then, the client terminal 20 sends an acquisition request to acquire a view of parameters for the conditional expression to the rule processing part 13c of the flow administration server 10 (step S508). The acquisition request includes the "system", the "Job", or the plug-in ID as the identification information of the belonging destination selected in the belonging destination selection region 731.

Subsequently, the rule processing part 13c acquires the view information of the parameters, which can be used for the conditional expression, from the belonging destination corresponding to the identification information included in the acquisition request (S509, S510). For example, the following parameter structure information is stored into the auxiliary memory device 102 for each of the belonging destinations.

FIG. 21 illustrates exemplary parameter structure information. Referring to FIG. 21, the parameter structure information of the mail delivery part 13d is illustrated. The parameter structure information includes a parameter ID, an access authority, a data form, a comparison operator, a label, and so on for each of the parameters held by the belonging destination.

The parameter ID is identification information for each parameter. The parameter ID may be a value used as the element name (a tag name) of an element corresponding to the flow definition data 500. The access authority indicates an authority of accessing the parameter from a party other than the belonging destination of this parameter (for example, other than the mail delivery part 13d). The "r" indicates a reference authority to refer. The "w" indicates a write authority. For example, as to the parameters related to any one of the processing parts (the plug-ins), the "r" represents the reference authority to refer the value of the parameter included in the job definition data, and the "w" represents the write authority to write in the parameter included in the job definition data. The data form is a data form of the parameter. The comparison operator is a comparison operator usable for the parameter. Other than the illustrated comparison operators, begins-with matching, ends-with matching, or perfect matching may be used as the comparison operator. The label is a character string used for displaying the parameter on the user interface or the like.

In a case where the parameter is used in the conditional expression, the value of the parameter is not changed. Said differently, it is sufficient to have the reference authority of the parameter when the parameter is used in the conditional expression. Therefore, in steps S509 and S510, a view (hereinafter, referred to as a "view list for the conditional expression") of the parameter information having "r" in its access authority is acquired in the parameter structure information corresponding to the identification information included in the acquisition request to acquire the view of the parameters for the conditional expression. The parameter information is information including the parameter ID, the data form, the label, and so on.

Subsequently, the rule processing part 13c returns the view of the parameters for the conditional expression to the client terminal 20 (step S511). The client terminal 20 uses a list box of the target parameter selection region 732 so as to display a view of labels included in the view of the parameters for the conditional expression (step S512).

Subsequently, the user selects any one of the parameters from the displayed view (step S513). The client terminal 20 sets the comparison operator included in the parameter information related to the selected parameter in the comparison operator selection region 733 of the conditional expression setup screen 730 as options. The client terminal 20 sets the comparison value input region 734 so that a value which can be input into the comparison value input region 734 is limited to a data form included in the parameter information related to the selected parameter.

Subsequently, the user selects the comparison operator, inputs the comparison value, and pushes the OK button 735. Then, the client terminal 20 reflects (copies) a setup content of the conditional expression setup screen 730 onto the conditional expression view display region 7222 of the rule edit screen 720 (FIG. 18). Said differently, a new row is added to the conditional expression view display region 7222, and the setup content of the conditional expression setup screen 730 is set to the row.

On the other hand, when the add button 7233 in the action list edit region 723 of the rule edit screen 720 (FIG. 18) is pushed, an action definition setup screen 740 is displayed in the client terminal 20.

FIG. 22 is an exemplary display of the action definition setup screen 740. Referring to FIG. 22, the action definition setup screen 740 includes a branch destination selection region 741, a belonging destination selection region 742, a target parameter selection region 743, a changed value input region 744, an OK button 745, and an OK button 745, and so on.

The branch destination selection region 741, the belonging destination selection region 742, and the target parameter selection region 743 are list boxes for selecting the branch destination, the belonging destination, and the target parameter, which form the action definition. The changed value input region 744 is a region where an input of the changed value forming the action definition is received.

Figure 23:
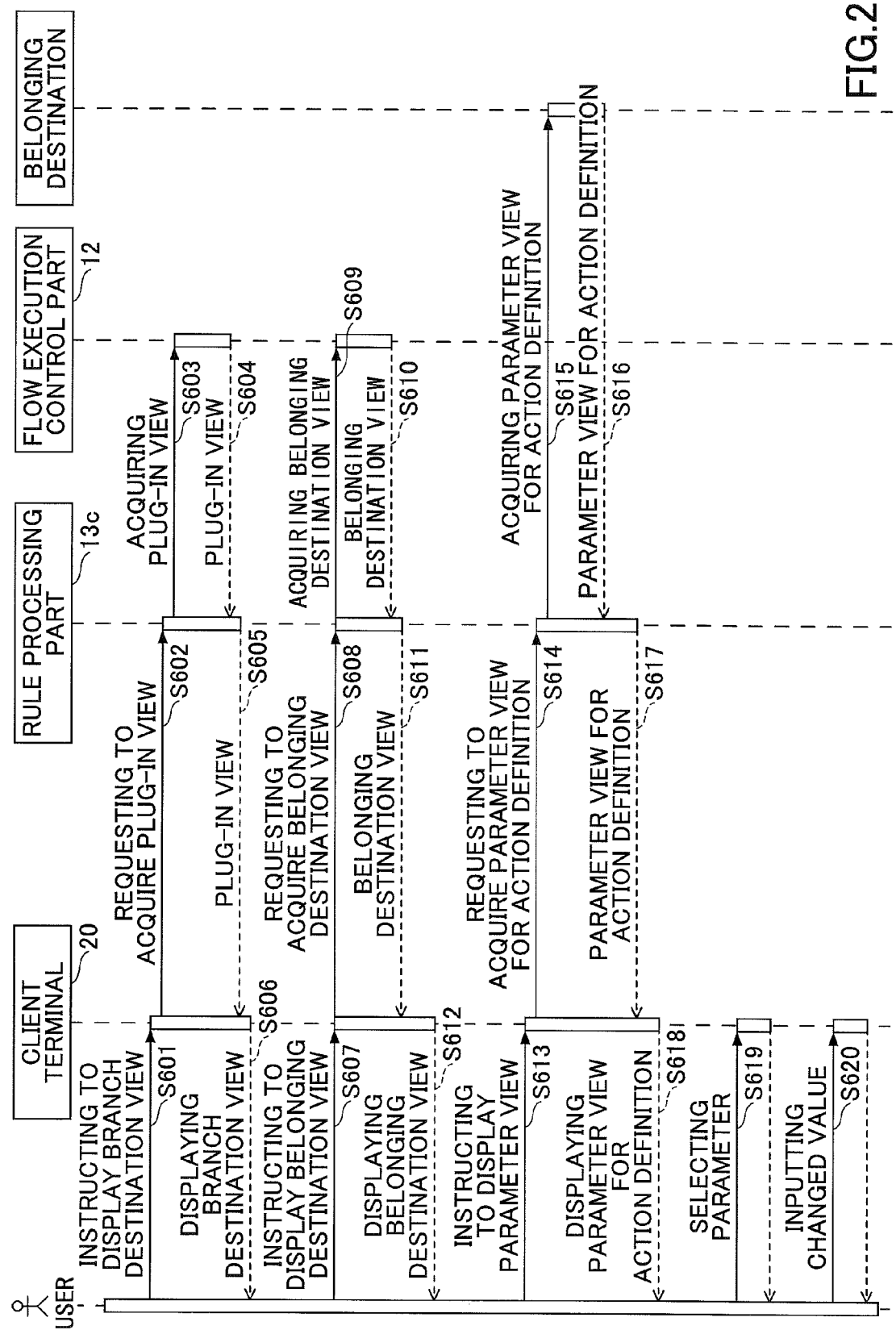
FIG. 23 is a sequence chart of explaining an exemplary procedure executed in response to an operation on the action definition setup screen.

FIG. 23 is a sequence chart of explaining an exemplary procedure executed in response to an operation on the action definition setup screen.

When the user operates the branch destination selection region 741, a display of a view of the branch destination is instructed (step S601). The client terminal 20 sends an acquisition request of a view of the branch destination to the rule processing part 13c of the flow administration server 10 (step S602). The acquisition request includes a flow ID of the flow definition of the editing target and the execution order of the rule process.

Subsequently, the rule processing part 13c designates the flow ID and the execution order and requests to acquire a view of the branch destinations to the flow execution control part 12 (step S603). The flow execution control part 12 acquires view information (hereinafter, referred to as a "branch destination view") of candidates of the branch destinations and returns the branch destination view to the rule processing part 13c in response to the acquisition request (step S604). The branch destination view includes a plug-in ID of at least one processing unit (a plug-in element) which is defined so as to be executed next in the designated execution order in the flow definition data specified by the designated flow ID. For example, if the rule definition related to the third rule process is an editing target in the flow definition data 500 illustrated in FIG. 7, the plug-in IDs of the plug-in elements 550 and 560 whose execution orders are the 4-th position are acquired and included in the branch destination view.

Subsequently, the rule processing part 13c returns the branch destination view to the client terminal 20 (step S605). The client terminal 20 uses a list box of the branch destination selection region 741 and causes the views of the branch destinations to be displayed (step S606). The user selects any one of the branch destinations from the displayed branch destination view.

Subsequently, a display of the view of the belonging destinations is instructed upon an operation by the user of the belonging destination selection region 742 (step S607). Then, processes similar to steps S502 to S506 illustrated in FIG. 20 are executed (steps S608 to S612).

Subsequently, a display of the view of the target parameters is instructed upon an operation by the user of the target parameter selection region 743 (step S613). Then, processes similar to steps S508 to S512 illustrated in FIG. 20 are executed (steps S614 to S618). The target parameter of the action definition is a parameter of the changing target. Said differently, not only the reference authority but also the write authority are required for the parameter used for the action definition. Therefore, in steps S615 and S616, a view of the parameter information having "r" and "w" in its access authority is acquired in the parameter structure information corresponding to the identification information included in the acquisition request to acquire the view of the parameters for the action definition.

Subsequently, the user selects any one of the parameters from the displayed view (step S619). The client terminal 20 sets the changed value input region 744 so that a value which can be input into the changed value input region 744 is limited to a data form included in the parameter information related to the selected parameter.

Subsequently, the user inputs the changed value and pushes the OK button 745. Then, the client terminal 20 reflects (copies) a setup content of the action definition setup screen 740 onto the action definition view display region 7232 of the rule edit screen 720 (FIG. 18). Said differently, a new row is added to the action definition view display region 7232, and the setup content of the action definition setup screen 740 is set to the row.

Within the embodiment, the flow administration server 10 is an example of an information processing apparatus or an information processing system. The flow execution control part 12 is an example of a process control part. The rule processing part 13c is an example of a selection part.

As described above, within the embodiment, the flexibility of the process flow which is formed by a combination of the processing units can be improved.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an information processing apparatus has been described in detail, it should be understood that various changes, substitutions, and alterations could be made thereto without departing from the spirit and scope of the invention.

This application is based upon and claims the benefit of priority of the prior Japanese Patent Application No. 2014-155891, filed on Jul. 31, 2014, the entire contents of which are incorporated herein by reference.

What is claimed is:

1. An information processing apparatus comprising:
 a hardware processor that executes a program so as to implement:
 a process control part configured to execute at least one processing unit that is provided for input data and is executed in an order defined in definition information and
 a rule processing part configured to
 select a target processing unit, which is executed by the process control part, is from among a plurality of processing units defined in the definition information, and is a candidate to be executed based on output information obtained from the at least one processing unit after the at least one processing unit is executed, and
 set a target parameter to be used for executing the target processing unit before executing the target processing unit, the target parameter being overwritten when the rule processing part determines that the output information meets a specified condition, set by a user in advance, during execution of the at least one processing unit.

2. The information processing apparatus according to claim 1,
 wherein the rule processing part selects the target processing unit among the plurality of processing units based on an evaluation result of conditions which are previously set for the output information.

3. The information processing apparatus according to claim 2,
 wherein the rule processing part selects the target processing unit corresponding to a satisfied condition among the conditions which are set for each of the plurality of processing units defined as the candidate.

4. The information processing apparatus according to claim 3,
 wherein the process control part causes information associated with the conditions which are set for each of the plurality of processing units defined as the candidate to be input information for the target processing unit selected by the rule processing part.

5. An information processing system including an information processing apparatus comprising:
 a process control part configured to execute at least one processing unit that is provided for input data and is executed in an order defined in definition information; and
 a rule processing part configured to
 select a target processing unit, which is executed by the process control part, is from among a plurality of processing units defined in the definition information, and is a candidate to be executed based on output information obtained from at least one processing unit after the at least one processing unit is executed, and
 set a target parameter to be used for executing the target processing unit before executing the target processing unit, the target parameter being overwritten when the rule processing part determines that the output information meets a specified condition, set by a user in advance, during execution of the at least one processing unit.

6. The information processing system according to claim 5,
 wherein the rule processing part selects the target processing unit among the plurality of processing units based on an evaluation result of conditions which are previously set for the output information.

7. The information processing system according to claim 6,
 wherein the rule processing part selects the target processing unit corresponding to a satisfied condition among the conditions which are set for each of the plurality of processing units defined as the candidate.

8. The information processing system according to claim 7,
 wherein the process control part causes information associated with the conditions which are set for each of the plurality of processing units defined as the candidate to be input information for the target processing unit selected by the rule processing part.

9. A method of processing information performed in an information processing system including an information processing apparatus, the method comprising:
 executing at least one processing unit that is provided for input data and is executed in an order defined in definition information; and
 selecting a target processing unit, which is executed by the at least one processing unit, is from among a plurality of processing units defined in the definition information, and is a candidate to be executed based on output information obtained from the at least one processing unit after the at least one processing unit is executed, and setting a target parameter to be used for executing the target processing unit before executing the target processing unit, the target parameter being overwritten when the rule processing part determines that the output information meets a specified condition, set by a user in advance, during execution of the at least one processing unit.

10. The method according to claim 9, wherein the selecting the target processing unit selects the target processing unit among the plurality of processing units based on an evaluation result of conditions which are previously set for the output information.

11. The method according to claim 10, wherein the selecting the target processing unit selects the target processing unit corresponding to a satisfied condition among the conditions which are set for each of the plurality of processing units defined as the candidate.

12. The method according to claim 11, wherein the executing the at least one processing unit causes information associated with the conditions which are set for each of the plurality of processing units defined as the candidate to be input information for the target processing unit selected by the selecting the target processing unit.

* * * * *